United States Patent [19]

Yamasaki et al.

[11] Patent Number: 5,578,214

[45] Date of Patent: Nov. 26, 1996

[54] APPARATUS AND METHOD FOR WASTE WATER TREATMENT UTILIZING AEROBIC AND ANAEROBIC MICROORGANISMS AND CAPABLE OF EXHAUST GAS TREATMENT

[75] Inventors: Kazuyuki Yamasaki, Hiroshima; Masaki Kataoka, Fukuyama; Shirou Imazu, Fukuyama; Kenji Matuura, Fukuyama, all of Japan

[73] Assignee: Sharp Kabushiki Kaisha, Osaka, Japan

[21] Appl. No.: 504,585

[22] Filed: Jul. 20, 1995

[30] Foreign Application Priority Data

Aug. 3, 1994 [JP] Japan .................................. 6-182324
Jun. 19, 1995 [JP] Japan .................................. 7-151453

[51] Int. Cl.$^6$ .................................................. B01D 61/00
[52] U.S. Cl. .......................... 210/650; 210/611; 210/617; 210/625; 210/620; 210/151; 210/206; 210/195.1; 210/195.2; 210/257.2
[58] Field of Search .......................... 210/195.1, 195.2, 210/605, 601, 603, 607, 611, 615, 616, 617, 620, 621, 631, 650, 651, 660, 220, 202, 206, 257.2, 151, 629; 95/92, 133, 134

[56] References Cited

U.S. PATENT DOCUMENTS

| 3,856,485 | 12/1974 | Mansell ..................................... 95/133 |
| 4,209,390 | 6/1980 | Cabane et al. ........................... 210/617 |
| 4,469,599 | 9/1984 | Gros et al. ................................ 210/617 |
| 4,680,111 | 7/1987 | Ueda ........................................ 210/150 |
| 4,832,847 | 5/1989 | Fujii et al. ................................ 210/617 |
| 4,933,076 | 6/1990 | Oshima et al. ........................... 210/151 |
| 5,342,522 | 8/1994 | Marsman et al. ........................ 210/605 |
| 5,423,988 | 6/1995 | Yamasaki et al. ....................... 210/617 |

FOREIGN PATENT DOCUMENTS

| 0142872 | 5/1985 | European Pat. Off. . |
| 53-35251 | 4/1978 | Japan . |
| 2-21000 | 2/1990 | Japan . |
| 2-61424 | 5/1990 | Japan . |
| 4-305287 | 10/1992 | Japan . |
| 1456936 | 12/1976 | United Kingdom . |

OTHER PUBLICATIONS

Database WPI, Week 9432, Derwent Publications Ltd., London, GB; AN 94–259753 & JP-A–06 190 387 (Sharp KK), 12 Jul. 1994 *abstract*.
Database WPI Week 8836, Derwent Publications Ltd., London, GB; AN 88–252674 & JP-A–63 182 099 (Toshiba KK), 27 Jul. 1988 *abstract*.
Patent Abstracts Of Japan, vol. 95, No. 004 & JP-A–07 100486 (Mitsubishi Rayon) 18 Apr. 1995, *abstract*.
Patent Abstracts Of Japan, vol. 94, No. 012 & JP-A–06 343974 (Sharp Corporation) 20 Dec. 1994, *abstract*.
Database WPI Week 9524 Derwent Publications Ltd., London, GB; AN 95–182280 & JP-A–07 100 486 (Inax KK et al.), 18 Apr. 1995, *abstract*.

*Primary Examiner*—Ana Fortuna
*Attorney, Agent, or Firm*—Nixon & Vanderhye, P.C.

[57] ABSTRACT

A waste water treatment apparatus is provided which can treat a high-concentration waste water containing persistent chemical substances including nitrogen and surfactant simultaneously with small amount of exhaust gases and is yet simple in construction. The apparatus has a first bioreactor having a lower portion including an inflow pipe for admission of waste water to be treated and aeration means, and an upper portion packed with vinylidene chloride fillers; a second bioreactor including a filler-packed portion packed with charcoal and calcium carbonate fillers; and an exhaust gas introduction diffuser for directing exhaust gases generated in an uppermost portion of the first bioreactor into the filler-packed portion. The water under treatment is anaerobically treated in the lower portion and is subjected to aerobic treatment and also to anaerobic treatment in the upper portion. Further, in the second bioreactor, the water under treatment is again aerobically treated and, at the same time, the exhaust gases from the first bioreactor are also aerobically treated.

19 Claims, 13 Drawing Sheets

Fig.5

| TREATING UNIT | | OPERATING CONDITION 24HR. 0 — 12 — 24 |
|---|---|---|
| 1ST REACTOR (BATCH SYSTEM) | CIRCULATION BLOWER 9 | ON / OFF |
| | SEPARATING BLOWER 10 | OFF / OFF (brief ON at start and middle) |
| | STORAGE PUMP 2 | OFF (brief ON at start) |
| | NUTRIENT PUMP 13 | OFF (brief ON at start) |
| | LIFT PUMP 14 | OFF (brief ON at end) |
| | EXHANST GAS BLOWER 15 | ON |
| RELAY TANK | RELAY PUMP 17 | ON |
| 2ND REACTOR | CIRCULATION BLOWER 11 | ON |
| PRECIPITATION TANK | RETURN PUMP 25 | OFF (brief ON at start) |
| | COLLECTOR 24 | ON |

SHADED AREA : ON

Fig.6

| TREATING UNIT | | OPERATING CONDITION 24HR. 0 — 12 — 24 |
|---|---|---|
| 1ST REACTOR (CONTINUOUS) | CIRCULATION BLOWER 9 | ON |
| | SEPARATING BLOWER 10 | OFF / OFF (brief ON at start and middle) |
| | STORAGE PUMP 2 | ON |
| | NUTRIENT PUMP 13 | ON |
| | LIFT PUMP 14 | ON |
| | EXHANST GAS BLOWER 15 | ON |
| RELAY TANK | RELAY PUMP 17 | ON |
| 2ND REACTOR | CIRCULATION BLOWER 11 | ON |
| PRECIPITATION TANK | RETURN PUMP 25 | OFF (brief ON at start) |
| | COLLECTOR 24 | ON |

SHADED AREA : ON

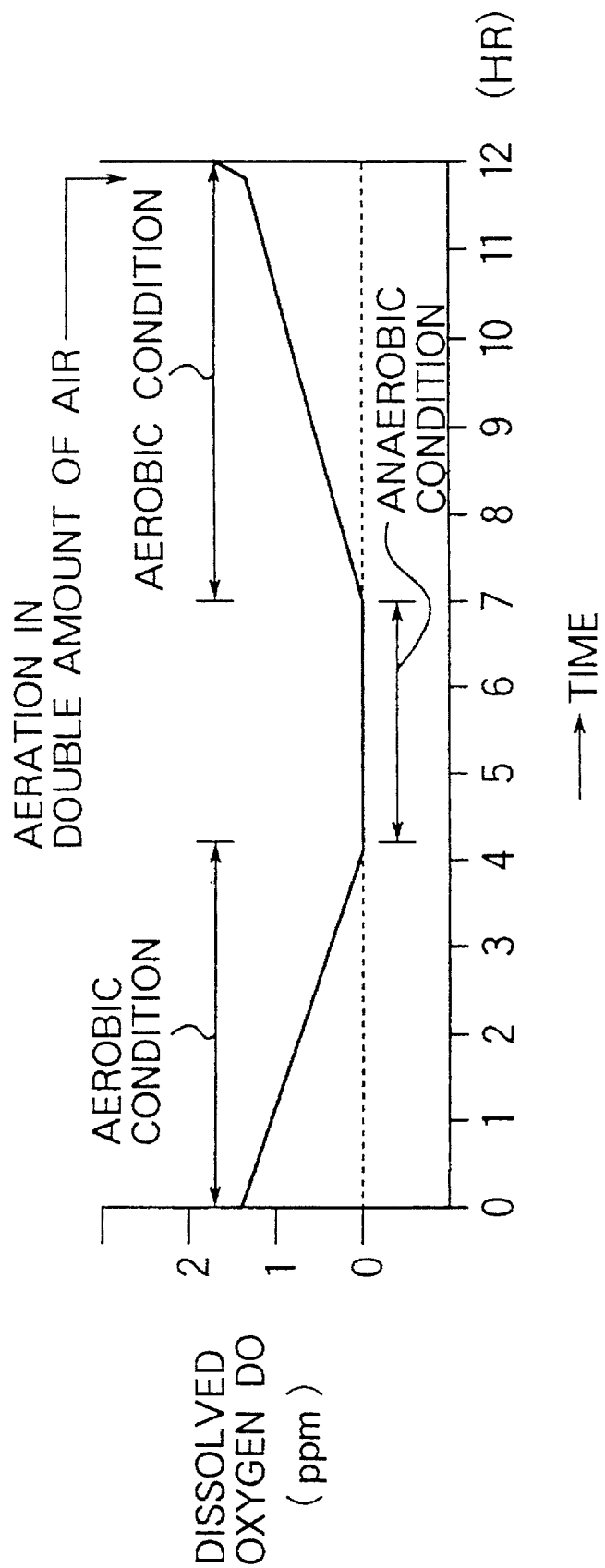

ent apparatus. The apparatus includes an anaerobic tank for treating the waste water with anaerobic microorganisms, two aerobic tanks for treating the waste water with aerobic microorganisms, a precipitation tank, and a filter tank. This waste water treatment apparatus, as shown in FIG. 11A, operates in such a sequence that an incoming waste water containing a development liquid is first anaerobically treated in the anaerobic tank, then aerobically treated in the aerobic tank, and then catalytically oxidized in the second aerobic tank, the sludge in the waste water being precipitated in the precipitation tank, the waste water under treatment being then subjected to filtration in the filter tank.

APPARATUS AND METHOD FOR WASTE WATER TREATMENT UTILIZING AEROBIC AND ANAEROBIC MICROORGANISMS AND CAPABLE OF EXHAUST GAS TREATMENT

BACKGROUND OF THE INVENTION

1. Field of the Invention

The present invention relates to a method and apparatus for waste water treatment wherein waste water is treated with aerobic and anaerobic microorganisms simultaneously with exhaust gas treatment so that nitrogen-containing persistent chemical substances and nitrogen compounds can be treated to a high standard.

2. Description of the Prior Art

Generally, for the purpose of treating waste water in a factory, various treatment processes are employed according to the quality of the waste water. In some cases, chemical treatment processes are employed including neutralization, reaction, and coagulation processes. In other cases, biological treatment processes are employed including biological membrane, catalytic oxidation, activated sludge, special biological treatment, and anaerobic treatment processes. In still other cases, physical treatment processes are employed including precipitation, filtration, adsorption, floatation, and membrane treatment processes. Further, it is known to employ some of these conventional processes in combination to treat a high-concentration toxic waste water (see Japanese Patent Application Laid-Open Nos. H1-95000 and S64-43306).

In August, 1993, the Water Quality Bureau of the Japanese Environment Agency established an environmental quality standard and an effluent standard with respect to nitrogen (total nitrogen) and phosphorus. Hence, regulations on nitrogen (hereinafter nitrogen refers to total nitrogen) and phosphorus in effluent came into effect under the Water Pollution Control Law.

Earlier, nitrogen and phosphorus in effluent or waste water were regulated under more stringent prefecture standards put in force by any particular self-governing body.

It may be anticipated that the current control on nitrogen and phosphorus under the water pollution control law will be carried out in a stricter manner. Therefore, particularly for the treatment of waste liquids containing nitrogen in a larger amount, such as waste developer in semiconductor and liquid crystal plants, a need exists for a waste developer treating apparatus which can treat even a nitrogen content of such waste liquid and which is yet efficient and economical.

More specifically, there exists a need for such a waste water treatment apparatus as can treat waste liquid in one bioreactor not only with respect to such items as TMAH (Tetramethyl Ammonium Hydroxide) and BOD (Biological Oxygen Demand) in a developing solution, but also with respect to nitrogen in the liquid to a certain degree. With reference to waste developer in particular, a waste water treatment apparatus is needed which is capable of treating items such as TMAH contained in the waste developer in a high concentration, BOD, nitrogen, and surfactant (surface active agent).

However, the foregoing conventional methods for waste water treatment are simply intended to treat TMAH, and none of them are concerned with economical and reasonable treatment of nitrogen and/or surfactant.

FIG. 9 shows a conventional waste water treatment apparatus capable of treating nitrogen and surfactant and FIG. 11A is a system diagram for a conventional waste water treatment apparatus.

In addition, another conventional waste water treatment apparatus is shown in FIG. 12. This waste water treatment apparatus comprises (1) an anaeration tank 140 and an aeration tank (aerobic tank) 141 for treating TMAH and nitrogen compounds, (2) a catalytic oxidation tank (aerobic tank) 143 for treating a surfactant, (3) a denitrification tank 144 and a reaeration tank 145, (4) a filtration tower 148 for treating SS (suspended solids) and (5) an activated carbon adsorption tower 149 for treating coloring components. The waste water treatment apparatus comprises more treatment tanks than the treatment apparatus shown in FIG. 9, so as to clear the nitrogen regulation (regulation value: max. 120 ppm). The waste water treatment apparatus shown in FIG. 12 is the same as the waste water treatment apparatus shown in FIG. 9, in that it comprises the anaerobic tank 140, the aerobic tank (aeration tank) 141, the aerobic tank (catalytic oxidation tank) 143, and a second precipitation tank 146. On the other hand, the waste water treatment apparatus shown in FIG. 12 is different from the waste water treatment apparatus shown in FIG. 9, in that the former comprises a first precipitation tank 142, the denitrification tank, the reaeration tank 145, a pit 147, a rapid filtration tower 148 and the activated carbon adsorption tower 149. Accordingly, the waste water treatment apparatus shown in FIG. 12 has more treatment tanks by 5 in number than the waste water treatment apparatus shown in FIG. 9. This waste water treatment apparatus treats waste water as follows. First, the apparatus anaerobically treats the influent waste water containing developer in the anaerobic tank 140, next, aerobically treats it in the aerobic tank 141, and then treats it by catalytic-oxidation in the aerobic tank 143. In addition, the first precipitation tank 142 plays a role to accelerate aerobic treatment in the aerobic tank 141 by returning sludge to the aerobic tank 141. Water to be treated from the aerobic tank 143 is introduced into the denitrification tank 144 for denitrification. Water to be treated from the denitrification tank 144 is reaerated, and is introduced into the second precipitation tank 146. Sludge is returned to the reaeration tank 145 from this precipitation tank 146. Then, water to be treated from the second precipitation tank 146 has been introduced into the pit 147, and is furthermore introduced into the rapid filtration tower 148. Water to be treated which is filtrated in the rapid filtration tower 148 is introduced into the activated carbon adsorption tower 149 for treatment by activated carbon. Thus, this waste water treatment apparatus can treat waste water much more effectively than the waste water treatment apparatus shown in FIG. 9.

However, not to mention the conventional waste water treatment apparatus shown in FIG. 12, the above described prior art waste water treatment apparatus shown in FIG. 9 requires quite a number of treating tanks, including an anaerobic tank, an aeration tank and a catalytic oxidation tank as aerobic tanks, a precipitation tank, and a filter tank; therefore, the apparatus cannot be said to be an economical and reasonable waste water treatment apparatus.

In the past, at many industrial establishments and research laboratories, the treatment of persistent chemical substances including nitrogen and the treatment of exhaust gases have been separately considered.

The arrangement of a conventional exhaust gas treatment apparatus is schematically shown in FIG. 10 and FIG. 14 by way of example. This exhaust gas treatment apparatus is of such arrangement that the exhaust gas introduced is directed into a tank packed with plastic fillers, and that water as pumped up by a circulating pump is sprinkled into the plastic-filler-loaded tank. The exhaust gas is cleared of unwanted components as gas/liquid contacting takes place within the plastic-filler-packed tank which has been subjected to water sprinkling, the resulting treated gas being then directed upward.

Besides, as shown in FIG. 14, if three units of exhaust gas treatment apparatus shown in FIG. 10 are used, exhaust gas can be treated three times in quantity. The exhaust gas treatment apparatuses shown in FIG. 10 and FIG. 14 are effective for exhaust gases originating from acids, but not effective for exhaust gas containing organic substances. An exhaust gas treatment apparatus for exhaust gas including organic substances is shown in FIG. 13. This treatment apparatus consists of six activated carbon adsorption towers 151 in total. One of each two activated carbon adsorption towers 151 connected parallel is used as a spare. The activated carbon adsorption towers 151 adsorb organic substances. After adsorption of organic substances has been saturated with time, a spare adsorption tower replaces. While the spare adsorption tower operates, the saturated organic substances which activated carbon has adsorbed are removed by steam. This is why it is necessary to provide the spare adsorption towers.

In addition, another exhaust gas treatment apparatus Japanese Utility Model Laid-Open Publication No. H2-61424 has also been developed. However, the purpose to this apparatus is purely for treating exhaust gas and not for treating waste water as well as exhaust gas simultaneously. In addition, gas targeted by this apparatus is not exhaust gas containing organic substances but nitrogen oxides. In addition, this apparatus mainly uses activated sludge for treatment of exhaust gas, and does not have any conception to form biological membrane in fillers. It has no function to remove coloring components in waste water. Furthermore, another waste water treatment equipment is described in Japanese Patent Laid-Open Publication No. H4-305287. In this apparatus, a bioreactor is provided with a membrane filter. However, this apparatus does not have a structure for performing a three-dimensional anaerobic treatment process as preliminary treatment of membrane filter and vinylidene chloride treatment process. There have been a denitrification tank for waste water treatment Japanese Utility Model Laid-Open Publication No. H2-21000 and a treatment method for water including nitrogen compounds Japanese Patent Laid-Open Publication No. S53-35251. However, they do not treat exhaust gas as well as waste water as a total system of waste water treatment.

In this way, waste water has hitherto been treated by a waste water treatment apparatus, while exhaust gases have been treated, separately from such waste water treatment, by an exhaust gas treatment apparatus of such a system as scrubber, activated carbon adsorption, or combustion system.

However, the fact that a waste water treatment apparatus and an exhaust gas treatment apparatus are separately considered as in the past poses a problem because it can be a cause of reduced equipment efficiency at production facilities and/or research laboratories.

In case that waste water containing persistent chemical substances including nitrogen is of a high concentration, it is required that the waste water be diluted and, in order to carry out such dilution, it is necessary that constituent tanks of the waste water treatment apparatus, such as aeration and precipitation tanks, be larger in size. This involves increased initial cost.

For the treatment of production-related exhaust gases originating in chemicals (for example, organic solvents) used in production stages within a plant, and of odoral gases arising from waste water treating facilities, various treating systems are available including a scrubber system using a chemical and/or water flush, an adsorption system utilizing activated charcoal, and combustion system. Naturally, however, these systems involve great problems in respect of initial cost, running cost, management, and installation space requirement. Particularly, in an activated carbon adsorption tower, it is a problem that running cost is extremely high since extraction of activated carbon and regeneration thereof in a different place are required. In addition, if there is a great amount of exhaust gas to be treated, it is another problem that running cost becomes enormous.

In particular, semiconductor and liquid crystal plants may sometimes be confronted with complaints from people in the neighborhood by reason of odor arising from the plant even when the odor is of such a slight degree as will pose no legal problem. In such a case, basically a treatment apparatus for such odoral gas should be installed, but the problem is that installing a full-scale odoral gas treatment apparatus by reason of a small degree of odoral gas emission is uneconomical because it involves excessive cost burdens including construction, maintenance and management costs.

More particularly, a high-concentration toxic effluent from an existing semiconductor plant or liquid crystal plant, for example, a waste water containing a development liquid, contains 2000 to 10000 ppm of tetramethyl ammonium hydroxide (hereinafter referred to as "TMAH"), a substance having biological toxicity. Various surfactants are also included in addition to TMAH. TMAH is a compound comprised of carbon, hydrogen, nitrogen and oxygen as its molecular formula indicates. With nitrogen control in progress under the Water Pollution Control Law as revised, a rational and economical method for nitrogen treatment is required with respect to nitrogen compounds in water under treatment. Any anaerobic stage for denitrification will inevitably involve odor emission. Hence, efficient treatment of such odoral gas is strongly called for.

As earlier stated, at semiconductor and/or liquid crystal plants, any foaming due to surfactant in the water being treated or any odor emission from exhaust gases is a problem to people living in the neighborhood of the plant when considered from the view point of local environment maintenance, even if the foaming or odor emission is of a small degree. In particular, where the effluent stream for discharge of any treated water involving foaming due to surfactant is a source of agricultural water, the effluent is a great problem especially to the people in the neighborhood. In addition, the treated water is not apparently proper if it is colored yellow by coloring components (specifically resist components).

Generally, for the treatment of surfactant in the water under treatment at a final stage of waste water treatment, activated carbon treatment is in common practice. However, activated carbon treatment involves a problem that the life of the carbon is very short because the carbon is liable to a decrease in its inherent rate of adsorption after a given time period, and this necessitates withdrawal of the carbon for regeneration thereof. Recently, there have been developed various sorts of bioactivated carbon treatment apparatuses (see Japanese Patent Application Laid-Open Nos. H2-229595 and H4-260497). However, these apparatuses are primarily intended for the treatment of clean water of comparatively good quality and not particularly for time-consuming treatment of a waste water containing persistent surfactant. They use granular activated carbon, which involves high initial cost. Basically, they have no function to treat slight amounts of odoral gases and exhaust gases.

Meanwhile, the use of a granular activated carbon of the conventional system involves a problem that, since the activated carbon is of a granulated configuration, a failure to adjust the flow rate of back wash during a back washing operation may cause a mass of granular activated carbon to be washed away out of the apparatus.

Anyway, with such conventional activated carbon treatment apparatus as described above, it is impossible to rationally and economically carry out the treatment of a high-concentration toxic waste water containing persistent and less microbiodegradable surfactant in large amounts, as from semiconductor or liquid crystal plants, the treatment of such waste water being a time-consuming operation.

The reason is that since surfactant used in such plants are chemical substances of the type which is especially less microbiodegradable, the activated carbon, though it may initially adsorb and treat such agents to a certain extent, will rapidly come to the end of its service life, being no longer capable of adsorption for treatment. Even if a bioactivated carbon type apparatus is used, since the conventional practice with respect to persistent surfactant is such that the time allowed for contact reaction is only of the order of 2 hours, the contact reaction time is insufficient, it being thus impracticable to cause persistent chemical substances to be microbially degraded in an accurate and efficient manner.

In other words, with a conventional waste water treatment apparatus, even when activated carbon is utilized, it is not possible to more economically and more accurately treat high-concentration effluent discharged from such a plant as aforesaid with respect to slight amounts of surfactant, persistent chemical substances, the treatment of which requires more than 6 hours.

Naturally, it has been impracticable to treat waste water and waste exhaust gases simultaneously in an economical way.

According to certain experiments, when a high-concentration toxic waste water, such as waste developer, is treated without dilution and according to a conventional wastewater treating method, there are cases where there occurs a foaming phenomenon with the treated waste water due to a trace amount of surfactant present in the treated waste water if there exists a fall at the discharge point, even though the value of the treated waste water is considered to be well within a safe range under the state-of-the-art analysis techniques. Legally, this presents no problem whatsoever. Possibly, however, people living in the community may have a misunderstanding that treatment is still insufficient.

In the prior art, when such high-concentration waste water is treated without dilution and by increasing the concentration of microorganisms, because of the fact that both the microbial concentration and the waste water concentration are very high, there occurs a slight amount of odoral gas in the aeration tank during anaerobic treatment as well as during aerobic treatment. Where the quality of treated water is such that the water involves considerable foaming due to persistent surfactant, such treated water cannot be said to be quite safe to a bioecological system including such organisms inhabiting streams in areas of favorable natural environment as small fishes, and "Semisulcospicospira libertina", a kind of spiral shell, which serves as firefly feed. Such organisms in such areas generally have little power of resistance to environmental changes and, therefore, when a high-concentration toxic waste water is treated simply by a conventional method, they would not be able to live in such a treated water.

Treating high-concentration waste water without dilution involves presence of organic decomposition products in relatively large amounts, and the resulting treated water includes trace amounts of residual persistent surfactant and also trace amounts of residual organic substances. Conceivably, this may be the reason why aforesaid organisms could not live in such treated water.

There is known a method in which a high-concentration waste water is treated by being diluted about ten times, for example. However, this is not economical because it requires excessively large-sized apparatus.

Recently, a waste water treating system has been gaining popularity wherein the concentration of microorganisms is increased by utilizing various types of membrane filters. The use of such a system involves the problem of jamming with the membrane filter, and this requires periodical membrane cleaning, which adds to the cost and trouble of maintenance.

As stated above, prior-art waste water treatment apparatuses pose the following problems (1)–(5).

(1) (i) An anaerobic tank and aeration tank are used in treating TMAH, BOD and nitrogen contained in waste developer; (ii) a catalytic oxidation tank is used in treating surfactant; (iii) a filtration tank is used in treating SS (suspended solids); and (iv) an exhaust gas treatment apparatus is used in treating offensive odors and exhaust gases. This means a larger number of tanks required, say, an anaerobic tank, an aeration tank, a catalytic oxidation tank, a filtration tank, and an exhaust gas treatment apparatus, which poses the problem of high construction cost. When coloring components are treated by adsorption in the activated carbon adsorption tower 149 (refer to FIG. 12), the number of tanks increases and cost of the construction increases.

(2) Considering the quality aspect of treated water with respect to waste developer, the treated water may essentially meet the aforesaid regulatory control value. However, when the treated water is discharged into public waterways in an environmentally favorable district, if there exists a fall head between the discharge conduit and a public effluent stream, a foaming phenomenon may occur due to trace amounts of persistent surfactant, thus adversely affecting the scenic aspect of the environment.

(3) Any conventional waste water treatment apparatus is incapable of treating odoral gases and/or exhaust gases.

(4) Further, according to the arrangement of such a prior art treatment apparatus, it is not always possible to provide treated water of such a quality as will not adversely affect any aquatic life, such as small fishes or "Semisulcospira libertina", which are comparatively vulnerable to environmental pollution. This poses a problem such treated water may adversely affect global environment. More specifically, with treated water as obtained through the use of such conventional treatment apparatus, except that the treated water is diluted with large amounts of stream water and the like, even when the treated water meets the regulatory control value and involves no legal problem, the treated water may, as stated above, affect the bioecological system at discharge points in an area which has not suffered environmental disruption but is too scant of river water to sufficiently dilute the treated water, as recently often found with districts in which construction of a semiconductor plant and/or a liquid crystal plant is contemplated, so that there is a good reason to fear that the bioecological system which is vulnerable to environmental disruption may be destroyed. For example, according to the results of some experiments, when a treated water that meets the regulatory control value was obtained by treating a high-concentration toxic waste water without dilution and by employing aforesaid prior art apparatus and method for waste water treatment, aquatic organisms vulnerable to environmental disruption, such as small fishes and "Semisulcospira libertina", were not fully able to live in the treated water.

(5) Exhaust gases and persistent surfactant cannot be simultaneously treated and, therefore, an apparatus for treating exhaust gases is separately needed. This poses a problem that only for the treatment of trace amounts of odoral gases, the initial cost and running cost are exceptionally large.

SUMMARY OF THE INVENTION

Therefore it is an object of the present invention to provide an apparatus and method for waste water treatment which treats a high-concentration waste water containing persistent chemical substances including nitrogen, as represented by TMAH, and also containing surfactant; which can therefore positively provide treated water harmless to the bioecological system inhabiting environmentally favorable effluent areas; and which is simple in construction and affords ease of maintenance.

It is a further object of the invention to provide a waste water treatment apparatus and method which treats such high-concentration waste water as above mentioned and, simultaneously therewith, a slight amount of exhaust gas so that a non-odorant treated gas can be obtained in addition to a harmless treated water.

A further object of the invention is to provide waste water treatment apparatus capable of removing coloring components which waste water contains.

In order to accomplish the foregoing objects, the present invention provides an apparatus for waste water treatment comprising: a first bioreactor including a lower portion having an inflow pipe for admission of a water to be treated and aeration means, and an upper portion packed with vinylidene chloride fillers; aeration control means for controlling operation and stopping of the aeration means in the lower portion of the first bioreactor; and a second bioreactor including a contact circulation portion into which the water under treatment is to be introduced from the first bioreactor, the contact circulation portion being packed with charcoal and calcium carbonate fillers, and an aeration diffuser for aerating the contact circulation portion.

In an embodiment, a membrane filter is disposed above the vinylidene chloride fillers in the upper portion of the first bioreactor.

In the above described waste water treatment apparatus, waste water containing developer is first stored in a storage tank to a predetermined quantity and is then introduced into the first bioreactor. The waste water containing developer contains TMAH, BOD, surfactant, nitrogen and the like at high concentrations. Considering from the standpoint of microbial treatment, the TMAH and surfactant are persistent components.

The water to be treated is introduced into the lower portion of the first bioreactor. The lower portion of the first bioreactor is in an anaerobic condition. Organic substances contained in the water to be treated, as introduced into the first bioreactor, is subjected to digestive action of anaerobic organisms in the anaerobic portion. Then, the water under treatment is gradually taken bit by bit into the lower portion of the first bioreactor.

Usually, the lower portion of the first bioreactor is normally in an anaerobic condition, with anaerobic organisms grown therein to high concentration. In other words, the lower portion of the first bioreactor is in a non-aerated condition during most time periods, except for short aeration time periods. Therefore, in the lower portion of the first bioreactor, microbial sludge is concentrated to a high level due to the inherent settling behavior of microbial sludge, the sludge being thus securely held in an anaerobic condition.

By way of example, if aeration is effected two times a day, each time about ten minutes, for example, generation of gases peculiar to anaerobic sludge will be prevented, and thus the anaerobic microbial sludge will be prevented from moving upward. That is, in this case, the lower portion of the first bioreactor is maintained in such an anaerobic condition that the anaerobic sludge is constantly concentrated to high concentration, to the extent such that gas will not allow anaerobic microorganisms to move upward within the first bioreactor.

Therefore, such high-concentration waste water containing developer, as introduced into the first bioreactor, first undergoes a treatment such that organic substances contained therein are subjected to treatment by anaerobic microorganisms (digestive action by anaerobic microorganisms).

This aspect is basically of the same concept as anaerobic treatment of high-concentration night-soil in general. That is, all organic substances contained in waste water containing developer are first decomposed by anaerobic microorganisms.

The waste water thus anaerobically treated gradually moves upward and, in the upper portion of the first bioreactor which, being packed with vinylidene chloride fillers, is in an aerobic condition, the water under treatment is sufficiently agitated to a uniform water quality, being thus aerobically treated.

In this way, all organic substances contained at a high-concentration in the waste water containing developer are first anaerobically treated and then subjected to a unique aerobic treatment. The "unique aerobic treatment" herein is a combination of a treatment through microbial concentration changes and a treatment by a mixture of aerobic microorganisms and anaerobic microorganisms. Through this unique aerobic treatment organic substances are efficiently decomposed and treated. During such unique aerobic treatment the waste water is likely to be denitrified by anaerobic microorganisms.

More specifically, first (i) organic substances contained in the waste water are digested by anaerobic microorganisms in the lower portion of the first bioreactor; then (ii) toxic nitrogen compounds (e.g. ammonia nitrogen, nitrite nitrogen, etc.) contained in the waste water are oxidized (nitrated) (nitrate nitrogen) by aerobic microorganisms in the upper portion of the first bioreactor to become non-toxic; and then (iii) the waste water is denitrified by anaerobic microorganisms present in the upper portion of the first bioreactor. The above enumerated functions (i), (ii) and (iii) are main functions of microorganisms in the first bioreactor.

The waste water under treatment which has been subjected to the foregoing actions (i), (ii), (iii) has already changed to a configuration that is unlikely to cause jamming at the membrane filter. However, in case that a filter membrane diffuser for air-cleaning the membrane surface is provided below the membrane filter, it is possible to effectively avoid jamming at the membrane filter. The membrane filter, which is employed in a continuous waste water treatment apparatus, is capable of filtering not only organic substances, polymeric substances such as protein, but also comparatively small microorganisms such as viruses. The apparatus having a membrane filter provides for constant supply of treated water resulting from continuous filtering operation of the membrane filter. Therefore, according to this arrangement, the waste water treating capability of the apparatus can be enhanced. In other words, according to the embodiment, treated water is constantly obtained through the process of continuous filtration by the membrane filter, and not through the supply of supernatant water from the process of precipitation. This results in increased treating capability.

Next, whether the apparatus has the membrane filter or not, the water under treatment is introduced into the second bioreactor in which it is aerobically treated by microorganisms propagated on the surfaces and interiors of charcoal and calcium carbonate fillers packed in the contact circulation portion. Microorganisms, immobilized on the charcoal in the contact circulation portion of the second bioreactor, propagate taking nourishment from organic substances in the waste water. Charcoal is a porous material having multiple fine pores. The multiple fine pores constitute an assembly of differently-sized holes ranging from several microns to several hundred microns. Therefore, charcoal provides easy access for growth of various kinds of microorganisms. The presence of various-diameter holes allow microorganisms to choose holes suited for their propagation. Further, biological membrane layers are formed in the interior of the charcoal. The biological membrane layers formed within the charcoal act to adsorb thereon chemical substances, such as persistent surfactant, which are generally difficult to biologically degrade. In this way, even such chemical substances can be biologically degraded.

Subsequently, in the presence of the microbial membranes grown on the charcoal in the contact circulation portion, the water under treatment is caused to go into cyclic contact, time after time, with the activated charcoal by circulation air supply agitator means. Therefore, organic substances such as persistent surfactant are catalytically degraded and treated to a high standard.

Microorganisms which are most likely to grow on charcoal include bacteria, fungi, actinomyces, algae, and photosynthesized bacteria. It is reported that charcoal has a surface area of 200 m$^2$ per gram (source: Zenkoku Mokutan Kyokai i.e. Japanese Charcoal Association). Therefore, exceptionally wider biological membrane layers are formed in the second bioreactor than in the case where no charcoal is present therein. This enables the second bioreactor to exhibit exceptionally high organic substance treating capabilities.

In the second bioreactor, large varieties of microorganisms propagated on charcoal in the contact circulation portion serve in two ways, that is, first, the charcoal adsorbs substances to be treated and, second, biological membrane layers formed in the interior of charcoal biologically treat persistent surfactant and the like which are contained in the substances to be treated.

Whilst, the calcium carbonate fillers packed in the contact circulation portion have various types of microorganisms grown thereon which take nutrition from organic substances in the waste water under treatment. Further, the calcium carbonate fillers serve to neutralize the water being treated whose pH has shifted to the acid side under the influence of nitrite nitrogen and nitrate nitrogen which have become proportionally increased as a result of the treatment of nitrogen compounds contained in the waste water under treatment.

As stated above, one feature of the present invention is that at the upper portion of the first bioreactor the interior of the bioreactor is partially changed from an aerobic condition to an anaerobic condition in short time.

More specifically, anaerobic microorganisms present in the depth of biological membranes are separated and, through this separation, anaerobic microorganisms are drawn from masses of biological membrane sludge. By so doing it is possible to quickly create a partially anaerobic condition in the upper portion of the first bioreactor. Thus, a condition in which aerobic microorganisms and anaerobic microorganisms are present in combination is promptly created in the upper portion of the first bioreactor. Waste water is treated in such co-presence of aerobic and anaerobic microorganisms. In particular, anaerobic microorganisms present in the depth of the biological membranes are forcibly drawn out to be brought into contact with the water under treatment.

Therefore, according to the present invention, anaerobic microorganisms present within the bioreactor can be effectively utilized in a short time.

As obvious from the above, according to the invention, a waste water treatment apparatus is provided which can treat high-concentration effluent containing nitrogen-containing persistent chemical substances, as represented by TMAH, and surfactant; which can therefore accurately produce a treated water that is harmless to any bio-ecological system inhabiting an environmentally favorable effluent area; and which is simple in construction and affords ease of maintenance.

As a matter of general aspect, odor may arise in the course of anaerobic microbial treating operation. Conventionally, in the case of odor generation, a deodorizing apparatus has been required separately from the waste water treatment apparatus. At various industrial facilities and research institutes, the presence of acidic exhaust gases to be treated and organic exhaust gases containing organic solvents which are also to be treated has required separate exhaust gas treatment apparatuses for the respective types of exhaust gases.

To solve this problem, according to one embodiment of the invention, an exhaust gas introduction diffuser is provided which directs exhaust gases present in an uppermost portion of the first bioreactor to the contact circulation portion of the second bioreactor. In this case, exhaust gases discharged from the exhaust gas introduction diffuser pass randomly over the surface of biological membranes in the contact circulation portion which is packed with indefinitely configured charcoal and indefinitely configured calcium carbonate fillers, the exhaust gases being thus microbiologically treated by the biological membranes. That is, the exhaust gases are treated upon their contact with the biological membranes constructed of microorganisms propagated on the charcoal/calcium carbonate fillers. In other words, trace amounts of odoral gas arising from the lower portion having an anaerobic treating function, and exhaust gases originating in the production plant can be both treated by microorganisms grown, with nutrients taken from organic substances present in the water under treatment in the first bioreactor. Therefore, the construction of the treatment apparatus for treatment of both waste water and exhaust gas can be exceptionally simplified as compared with the prior art arrangement. Further, by so arranging as to introduce externally generated exhaust gases into the uppermost portion it is possible to treat exhaust gases from the external source.

Organic components of the exhaust gas serve as nutrients for microorganisms. This provides a secondary advantage that persistent surfactant can be utilized to enhance the microbial treating capability of the apparatus.

To summarize, principal features of the present invention lie in the below enumerated points (i) to (v).

(i) The first bioreactor includes an upper portion and a lower portion. The upper portion, being packed with vinylidene chloride fillers, is normally in an aerobic condition, and the lower portion is in an aerobic condition for a short time period and in an anaerobic condition over a long time period.

(ii) By aeration generated from the diffuser in the lower portion of the first bioreactor, sludge is physically separated from vinylidene chloride fillers in the upper portion of the first bioreactor, so that denitrification is facilitated by anaerobic bacteria present within masses of sludge attached to and grown on vinylidene fillers. That is, by creating a condition such that anaerobic and aerobic microorganisms are temporarily present in mixture it is possible to simultaneously carry out microbial treatment of TMAH by aerobic microorganisms and microbial treatment of nitrogen compounds, decomposition products of TMAH, by anaerobic microorganisms.

In the present invention, aerobic and anaerobic conditions are varied three-dimensionally, in concentration, and with time, within one bioreactor, whereby MLSS (Mixed Liquor Suspended Solids) representing a microbial concentration undergoes changes.

In the invention, vinylidene chloride fillers are packed in the upper portion of the first bioreactor to facilitate propagation of microorganisms on the vinylidene chloride fillers as far as possible, whereby microbial concentration within the first bioreactor can be exceedingly enhanced. A portion around the center of the vinylidene chloride fillers with microorganisms attracted noticeably thereto is constantly in an anaerobic condition. Therefore, if supply of aeration air into the bioreactor is stopped and time is allowed to lapse, the condition within the first bioreactor shifts fast toward an anaerobic condition under the influence of anaerobic microorganisms at the central portion of the first bioreactor. With vinylidene chloride fillers packed in the first bioreactor, it is possible to artificially create an aerated condition and an non-aerated condition thereby to achieve an aerobic condition and/or an anaerobic condition more speedily and accurately.

In particular, just before aeration by the diffuser at the lower portion of the first bioreactor is stopped, more than twice the quantity of air fed in ordinary aeration may be used to separate masses of sludge adhering to vinylidene chloride fillers in the upper portion, whereby an anaerobic condition can be created faster for denitrification.

Further, at the start of aeration, an air supply of twice the usual quantity of air may be fed through the air diffuser at the lower portion of the first bioreactor to separate and crush microorganisms adhering to vinylidene chloride fillers. By so doing it is possible to create a condition in which aerobic and anaerobic microorganisms are present in combination in a fluid flow portion. As a result of the separation, the concentration of microorganisms in the fluid flow portion is increased, so that increased treating capability can be obtained with respect to TMAH and nitrogen compounds. Furthermore, by creating aerobic and anaerobic conditions it is possible to utilize wide varieties of anaerobic and aerobic microorganisms for more accurate and integrated treatment of the subject waste water or waste water containing developer.

(iii) The second bioreactor has charcoal and calcium carbonate fillers packed alternately therein to allow propagation of various microorganisms on the charcoal and calcium carbonate. Therefore, the water under treatment which has been treated to a certain degree with respect to its TMAH and nitrogen contents in the first bioreactor is further subjected to a higher degree of treatment (items for treatment include TMAH, surfactant, BOD and SS) in the second bioreactor.

Nitrogen compounds, with TMAH as origin thereof, are microbially degraded to produce ammonia nitrogen, then nitrite nitrogen, and are oxidized to produce nitrate nitrogen. The calcium carbonate mineral serves to neutralize the water being treated whose pH has been lowered as a result of a proportional increase of nitrate nitrogen.

In the past, exhaust gas from a mineral acid originating in production equipment has been difficult to microbially treat. However, when such gas is mixed with an organic odoral gas generated in the first bioreactor, the resulting mixture gas can easily be microbially treated. That is, when an exhaust gas arising from a mineral acid is mixed with organic odoral gases generated in the first bioreactor, the configuration of the mineral acid can be changed so that the mineral acid can be treated in the second bioreactor.

(iv) Both waste water and exhaust gas are treated in the second bioreactor. Therefore, the apparatus serves for a combination of waste water and exhaust gas treating purposes. This provides for remarkable saving in the capital cost.

The invention provide a unique, three-dimensional bioreactor construction which makes it possible to establish an anaerobic portion and an aerobic portion (where an anaerobic portion is created in a part of the aerobic portion) according to the progress of treatment. Thus, in one bioreactor, organic substances are digested by anaerobic microorganisms at the lower portion; nitrogen compounds are nitrified by aerobic microorganisms in the upper portion of the reactor; and separated anaerobic microorganisms function to denitrify total nitrogen. The three-dimensional construction of the apparatus is effective for installation space saving.

(v) High-concentration organic waste water is subjected to digestion by anaerobic microorganisms in the lower portion of the first rector; further, the waste water is treated under a condition in which anaerobic and aerobic microorganisms are present in combination, so that adhesion of organic substances is accurately reduced. Thereafter, the membrane filter is operated to continuously provide filtered water.

In case that a nutrient and a hydrogen donor are added to the first bioreactor, the nutrient will facilitate the propagation of anaerobic and aerobic microorganisms, whereby improved efficiency can be achieved in waste water treatment. The addition of the hydrogen donor will enhance treatment efficiency for denitrification. According to one embodiment, waste isopropyl alcohol (hereinafter referred to as IPA), as used in large amounts at semiconductor or liquid crystal plants, is used as aforesaid hydrogen donor.

This contributes to the effective utilization of resources. Generally, methanol is often used as such, but the use of waste IPA instead of fresh methanol is more economical.

In an embodiment, the first bioreactor has a separation wall provided between the upper and lower portions thereof for inhibiting convection between the upper and lower portions. This will enhance the independence of the upper and lower portions from each other thereby to ensure improved efficiency of microbial treatment in the upper portion and improved efficiency of microbial treatment in the lower portion.

In an embodiment, the apparatus for waste water treatment further comprises an air supply agitation means provided in the upper portion of the first bioreactor for supplying air to the upper portion; and control means for controlling the operation of the air supply agitation means to high and low levels. Thus, the upper portion of the first bioreactor can be freely controlled to either an aerobic condition or an anaerobic condition. Therefore, for example, the operation of the air supply agitation means may be set to low in synchronism with the process of separating microbial membranes deposited on the vinylidene chloride fillers, and may be set to high when such separating operation is not being done, whereby the microbial treatment capability of the upper portion can be enhanced.

If the contact circulation portion of the second bioreactor includes an air supply agitation means for circulating the water being treated and an air supply agitation means for supplying air to the fillers in the contact circulation portion, the microbial treating efficiency at the contact circulation portion of the second bioreactor can be improved. Further, by arranging that exhaust gases at the uppermost portion of the first bioreactor are supplied from the fillers air supply agitation means to the fillers in the contact circulation portion, not only is it possible to effectively treat waste water, but exhaust gases can be effectively treated as well.

In the case where the membrane filter is disposed on the vinylidene chloride fillers in the upper portion of the first bioreactor, the waste water being treated undergoes both microbial anaerobic and aerobic treatments in the lower and upper portions of the first bioreactor until it reaches the membrane filter. This provides an advantage that the membrane filter is less liable to jamming. With air supply means disposed between the membrane filter and the vinylidene chloride fillers, air supplied by the air supply means makes it much less likely that the membrane filter will suffer jamming.

The present invention also provides a method for waste water treatment comprising the steps of: introducing waste water to be treated into a lower portion of a first bioreactor via an inflow pipe, anaerobically treating the water in that lower portion, then directing the water under treatment to an upper portion of the first bioreactor; operating and stopping aeration means provided in the lower portion of the first bioreactor to temporarily produce microbial conditions in which anaerobic and aerobic microorganisms are present in mixture, and treating the water under the mixed microbial conditions; and introducing the water under treatment from the first bioreactor into a second bioreactor to permit the water to be introduced into a contact circulation portion of the second bioreactor, thereby allowing the water to come into contact with charcoal and calcium carbonate fillers which are present in the contact circulation portion.

In the waste water treating method of the invention, the waste water to be treated is introduced into the lower portion of the first bioreactor via the inflow pipe; the aeration means in the lower portion of the first bioreactor is controlled as to operation and stopping thereof; the waste water being treated is directed from the first bioreactor into the second bioreactor; then the waste water being treated is introduced into the contact circulation portion in the second bioreactor so that the waste water being treated is brought into contact with the charcoal and calcium carbonate in the contact circulation portion; and the contact circulation portion is aerated by means of the aeration diffuser.

Therefore, the waste water treating method of the invention is such that in the lower portion of the first bioreactor the water to be treated is anaerobically treated and the aeration means is intermittently operated to prevent the generation of gas due to the action of anaerobic microorganisms in the lower portion and, at the same time, to separate and crush microbial membranes deposited on the vinylidene chloride fillers in the upper portion of the first bioreactor so as to facilitate the contact of interior anaerobic microorganisms with the waste water under treatment. Thus, in the first bioreactor, the waste water is microbially treated with anaerobic microorganisms at the lower portion, and at the upper portion a condition in which there exist both anaerobic and aerobic phases is temporarily created so that the waste water is microbially treated with both aerobic and anaerobic microorganisms at the upper portion.

Therefore, the method is simple in apparatus construction and process as compared with any conventional method in which separate anaerobic and aerobic tanks in treating waste water. Further, in the second bioreactor, persistent substances, such as surfactant, contained in the microbially treated water from the first bioreactor are aerobically treated to a high standard by various kinds of microorganisms grown on the charcoal and calcium carbonate, more especially, masses of microorganisms grown on the charcoal.

Thus, according to the invention, a waste water treatment method is provided which can treat high-concentration effluent containing nitrogen-containing persistent chemical substances, as represented by TMAH, and surfactant; which can therefore accurately produce a treated water that is harmless to any bio-ecological system inhabiting an environmentally favorable effluent area; and which can treat waste water using a waste water treatment apparatus that is simple in construction and affords ease of maintenance.

More particularly, in the first bioreactor, trace amounts of TMAH, BOD, SS and more persistent surfactant are treated by microbial membranes, and trace amounts of ammonia nitrogen and nitrite nitrogen that are biologically toxic are further treated to harmless nitrate nitrogen. In the second bioreactor, the water under treatment, that is, waste water is caused to flow in circulation so that it repetitively goes into contact with the charcoal and calcium carbonate which is formed with microbial membranes, it being thus possible to treat through catalytic decomposition trace amounts of such substances as TMAH and surfactant to a high standard.

In an embodiment of the present invention, the water to be treated is caused to flow in circulation by air being constantly supplied in the upper portion of the first bioreactor so as to pass a membrane filter, the water being thereby introduced into the second bioreactor through the membrane filter.

According to this embodiment, the waste water under treatment is filtered through the membrane filter, it being thus possible to constantly introduce treated water into the second bioreactor by filtering waste water through the membrane filter on a continuous basis. Therefore, according to the invention, the waste water treating capability of the method can be enhanced. In other words, according to the invention, treated water is constantly obtained through the process of continuous filtration by the membrane filter, and not through the supply of supernatant water from the process of precipitation. This results in increased treating capability.

In an embodiment of the present invention, an exhaust gas is introduced into an uppermost portion of the first bioreactor to be mixed with a gas generated during the treatment of the water in the first bioreactor, the resulting mixture of the gases being introduced into the second bioreactor, whereby the exhaust gas is treated simultaneously with the water.

In the waste water treating method of the invention, if a nutrient and a hydrogen donor are added to the first bioreactor, propagation of anaerobic and aerobic microorganisms is enhanced by the nutrient thereby to provide improved waste water treatment efficiency. The addition of the hydrogen donor provides for improvement in denitrification effect.

In the waste water treating method of the invention, where a separation wall is provided between the upper and lower portions of the first bioreactor for inhibiting convection between the two portions, the independence of the upper and lower portions from each other can be enhanced to ensure improved efficiency of microbial treatment in both the upper and lower portions.

In the waste water treating method of the invention, if air is supplied into the upper portion of the first bioreactor by the air supply agitation means provided in the upper portion, with the operation of the air supply agitation means being controlled by the control means to high and low standards, the upper portion of the first bioreactor is freely controlled to either an aerobic condition or an anaerobic condition. Therefore, for example, the operation of the air supply agitation means is set to low in synchronism with the process of separating microbial membranes deposited on the vinylidene chloride filler material, and is set to high when such separating operation is not being done, whereby the microbial treatment capability of the upper portion can be enhanced.

The present invention overcomes the drawbacks of conventional apparatuses for waste water treatment and exhaust gas treatment and provides for efficient treatment of both waste water and exhaust gases to high standards. Also, the invention can achieve both capital cost saving and management cost saving.

The present invention also provides an apparatus for waste water treatment comprising: a first bioreactor having a first upper wetting portion in which charcoal and plastic fillers are packed and through which exhaust gas passes upward from below, and a first lower submerged portion in which vinylidene chloride fillers are packed and an air supply agitation means is placed near the vinylidene chloride fillers, and an introduction pipe for introducing waste water to be treated and a sludge separation diffuser are provided below the vinylidene chloride fillers; a second bioreactor having a second upper wetting portion in which charcoal and plastic fillers are packed, and through which exhaust gas passes upward from below, a second lower submerged portion in which charcoal and calcium carbonate mineral are packed, and an introduction means for introducing the waste water from the first lower submerged portion of the first bioreactor into the second lower submerged portion; a denitrification tank having an introduction means for introducing the waste water from the second lower submerged portion of the second bioreactor into the tank and a circulating means for circulating the introduced waste water; a third bioreactor having a third upper wetting portion in which charcoal and plastic fillers are packed and through which exhaust gas is passed from below to above, a third lower submerged portion in which charcoal and calcium carbonate mineral are packed, and an introduction means for introducing the water from the denitrification tank into the third lower submerged portion; a precipitation tank in which the waste water received from the third submerged portion of the third bioreactor is separated into solid and liquid, supernatant liquid being discharged from the precipitation tank, the precipitation tank having a sludge return means for returning sludge precipitated by the solid-liquid separation to the first upper wetting portion of the first bioreactor, the second upper wetting portion of the second bioreactor, and the third upper wetting portion of the third bioreactor.

In the apparatus, firstly, waste water containing developer being high-concentration organic waste water is entered into the lower submerged portion of the first bioreactor, and organic substances are mainly digestion-treated by anaerobic microorganisms in an anaerobic condition in an anaerobic portion under the vinylidene chloride fillers. Next, the waste water is raised so that organic substances in the waste water are biologically treated by both aerobic microorganisms grown on the surface of the vinylidene chloride fillers and anaerobic microorganisms within the vinylidene chloride fillers. Especially, nitrogen compounds (TMAH, ammonia nitrogen, nitrite nitrogen, nitrate nitrogen and the like) of the organic substances are treated. While they are treated, a microorganism concentration is changed by separating sludge of microorganisms from the vinylidene chloride fillers, and a state in which both aerobic microorganisms and anaerobic microorganisms are present is generated. Accordingly, organic substances in the waste water is effectively performed.

After treated in the first bioreactor, the waste water is introduced into the second bioreactor, in which organic substances included in the waste water are adsorbed onto charcoal in the second lower submerged portion owing to adsorption ability of the charcoal. Organic substances adsorbed on the charcoal are biologically treated by microorganisms grown. Specifically, a trace amount of TMAH, BOD, SS, persistent surfactant and coloring components (chromaticity is used as a measurement item) are treated by biological membranes constituted of a variety of kinds of microorganisms grown on surfaces of and in the interior of the charcoal. On the other hand, a trace quantity of ammonia nitrogen and nitrite nitrogen which have biological toxicity, are further treated by oxidation into harmless nitrate nitrogen.

In addition, the waste water circulates within the second lower submerged portion, and repeatedly contacts the calcium carbonate mineral consisting of oyster shells and the like and biologically activated charcoal, in which microorganism membrane is formed. Therefore, substances such as a trace amount of TMAH, surfactant and the like are treated to a high standard by contact-decomposition.

In addition, the denitrification tank is mainly for treatment of nitrogen compounds i.e. treatment of nitrate nitrogen. In this invention, even though a nitrogen concentration (total nitrogen concentration) in waste water is high as is the case with waste water containing developer, nitrogen compounds are effectively treated in the denitrification tank. This is because the nitrogen compounds have been previously treated in the first bioreactor.

In addition, in the above apparatus, charcoal is packed in the second lower submerged portion, the denitrification tank, the third lower submerged portion, the first upper wetting portion, the second upper wetting portion, and the third upper wetting portion. Therefore, as to waste water containing coloring components of which chromaticity is 4500 degrees or less in raw water like waste water containing developer, the coloring components are economically treated by making good use of charcoal adsorption ability to coloring components.

In this apparatus, a diffuser pipe for sludge separation is placed under the vinylidene chloride fillers of the first lower submerged portion in the first bioreactor. Therefore, both anaerobic microorganisms and aerobic microorganisms can be used for waste water treatment by separating organism sludge grown in and on the vinylidene chloride fillers with air which the diffuser pipe discharges. The first upper wetting portion, the second upper wetting portion and the third upper wetting portion are provided with the charcoal and the plastic fillers. Sludge from the precipitation tank is returned to the first, the second, and the third upper wetting portions together with treated water. The return sludge with the treated water is sprinkled. Therefore, biological membrane is formed in the charcoal and the plastic fillers and the biological membrane biologically treats exhaust gas.

Because the first bioreactor and the second bioreactor are placed before the denitrification tank, treatment of nitrogen compounds in the first bioreactor, nitration of nitrogen compounds in the second bioreactor and denitrification in the denitrification tank are carried out.

In other words, the waste water treatment apparatus is provided with a structure completely different from the conventional waste water treatment apparatuses and exhaust gas treatment apparatuses, and well treats both waste water containing developer and exhaust gas containing organic substances at less expensive cost for facilities and control than that of the conventional ones.

In an embodiment, a membrane filter is located over the vinylidene chloride fillers in the first submerged portion in the first bioreactor and a diffusion pipe for the membrane filter is located between the membrane filter and the vinylidene chloride fillers.

Therefore, according to this embodiment, treated water which is filtrated by the membrane filter is secured. An filtration membrane and precise filtration membrane are used as this membrane filter. According to this embodiment, treated water which is always continuously filtrated can be obtained, unlike the case that supernatant liquid is obtained by precipitation. Accordingly, treated waste water can always be secured stably without deteriorating the treated water at all in the precipitation tank owing to a bulking phenomenon. In other words, according to the above embodiment, even though the banking phenomenon occurs, deterioration of waste water by the banking phenomenon in the precipitation tank is eliminated. This is because treated water is secured through filtration of the membrane filter. In addition, since the diffuser pipe is placed under the membrane filter, the membrane filter is washed by the air discharged from the diffuser pipe. Therefore, clogging of the membrane filter due to high concentration organic substances is prevented.

In an embodiment of the present invention, charcoal and calcium carbonate mineral are packed in the denitrification tank.

Accordingly, the denitrification tank exerts not only a denitrification effect but also an adsorption effect of coloring components by the charcoal and a neutralization effect of water to be treated by the calcium carbonate mineral.

In an embodiment of the present invention, the second lower submerged portion of the second bioreactor has an air supply agitation means. And, the apparatus has an air supply control means for controlling operational power of the air supply agitation means of the first and second bioreactors.

Therefore, according to the above embodiment, the first and the second lower submerged portion can come to a desired aerobic state or a desired anaerobic state. Also, separation phenomena of sludge in the first and the second lower submerged portions can freely be controlled by controlling the air supply force strongly and weakly. Thus, since the anaerobic condition, the aerobic condition and the sludge separation condition can freely be controlled, efficient waste water treatment is performed in correspondence with quantity of water to be treated and concentrations of organic substances in the water to be treated.

In the above waste water treatment apparatus, if waste of IPA (isopropyl alcohol), which is used in abundance in a semiconductor plant and a liquid crystal plant, is used as a hydrogen donor, this use leads to an effective use of resource. Generally, methanol is often used as the hydrogen donor, but waste IPA is more economical than new methanol. If nutrition agents such as phosphoric acid are added to the first bioreactor in addition to this hydrogen donor, microorganisms will grow more normally.

When the above waste water apparatus comprises a separation wall in the first lower submerged portion of the first bioreactor in order to control a water stream between the anaerobic region below the vinylidene chloride and the aerobic region above the anaerobic region, the aerobic condition of the aerobic region and the anaerobic condition of the anaerobic region is clearly separated. Accordingly, the anaerobic treatment in the anaerobic region and the aerobic treatment in the aerobic region can effectively be executed.

In the above waste water apparatus, when further providing an air supply agitation means for supplying air to the third lower submerged portion and when controlling operational ability of this air supply agitation means strongly and weakly, a biological membrane present on and inside of the filter can be separated therefrom by controlling the air supply agitation means strongly and weakly, so that waste water containing biological membrane can be sprinkled over the first, the second and the third upper wetting portions. Therefore, an effect of removing organic substances from gas containing organic substances is improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is an operation time table for the first embodiment apparatus in operation;

FIG. 6 is an operation time table for the second embodiment apparatus in operation;

FIG. 7 is a diagram showing changes with time in dissolved oxygen concentration in an upper portion of a first bioreactor of the first embodiment;

DETAILED DESCRIPTION OF THE PREFERRED EMBODIMENTS

First Embodiment

Figure 1:
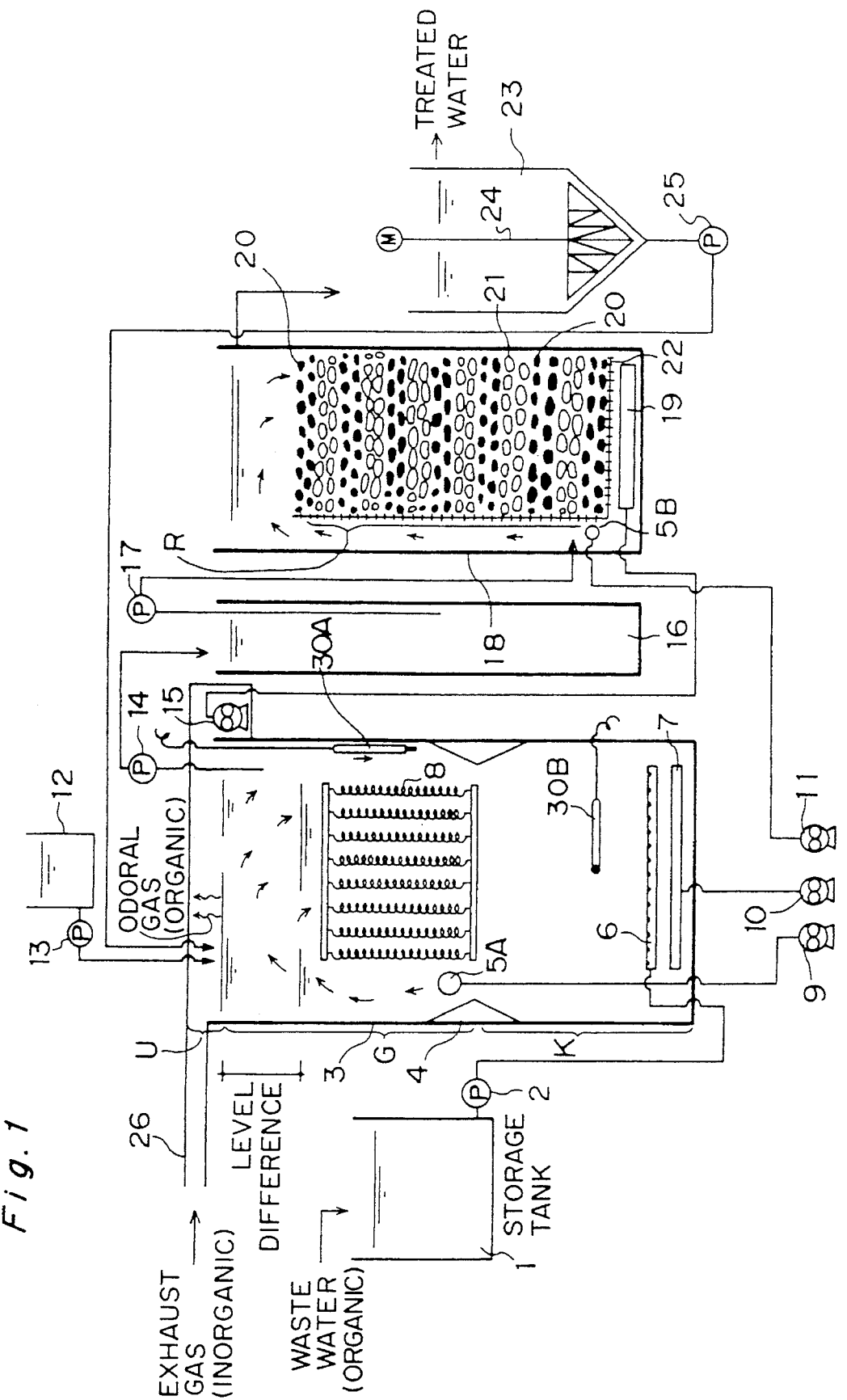
FIG. 1 is an illustration which schematically shows a first embodiment of the apparatus for waste water treatment in accordance with the present invention.

FIG. 1 illustrates the arrangement of a first embodiment of the waste water treatment apparatus according to the present invention. The first embodiment includes a storage tank 1, a first bioreactor 3, a relay tank 16, and a second bioreactor 18, and a precipitation tank 23. This first embodiment is of a batch system. The term "batch system" herein means a system in which when a supernatant is to be obtained in the first bioreactor 3, aeration is completely stopped and a mass of microorganisms is allowed to precipitate so that the supernatant (treated water) can be collected.

High-concentration waste water containing developer discharged from a semiconductor plant or liquid crystal plant is stored in the storage tank 1. Numeral 2 designates a storage tank pump. This storage tank pump 2 pumps waste developer stored in the storage tank 1 into a waste liquid introduction pipe 6 placed at the bottom of the first bioreactor 3. The waste developer is introduced through the waste liquid introduction pipe 6 into the first bioreactor 3.

The waste liquid introduction pipe 6 has a plurality of small holes formed at its upper portion so that waste developer is uniformly discharged upward from the bottom of the bioreactor 3 through the small holes. By virtue of this arrangement, improvement in the waste water treating performance is expectable. A sludge separating diffuser pipe 7 is disposed below the waste liquid introduction pipe 6. Connected to the sludge separating diffuser pipe 7 is a sludge separating blower 10 which supplies pressurized air to the sludge separating diffuser pipe 7.

Vinylidene chloride fillers 8 are disposed in an upper portion of the first bioreactor 3. The vinylidene chloride fillers 8 are arranged in laterally spaced plural rows between upper and lower plates. The vinylidene chloride fillers 8 attract various types of sludge including various microbial components so that such sludge deposits and grows on the fillers in the course of time during apparatus operation.

Figure 4B:
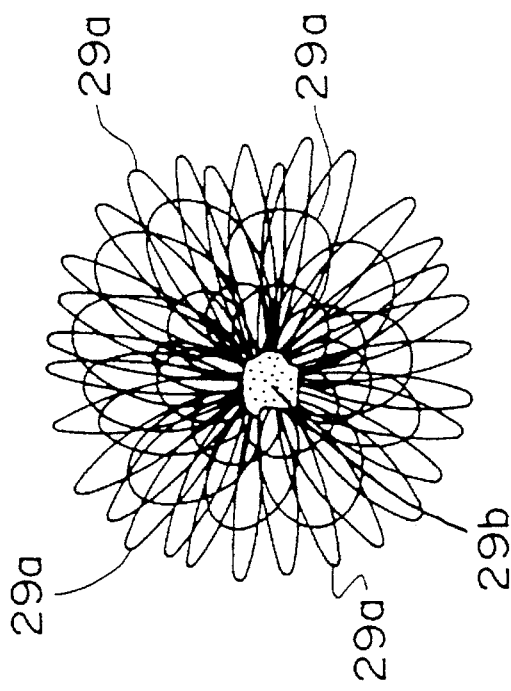
FIG. 4B is a sectional view of the vinylidene chloride filler.
Figure 4A:
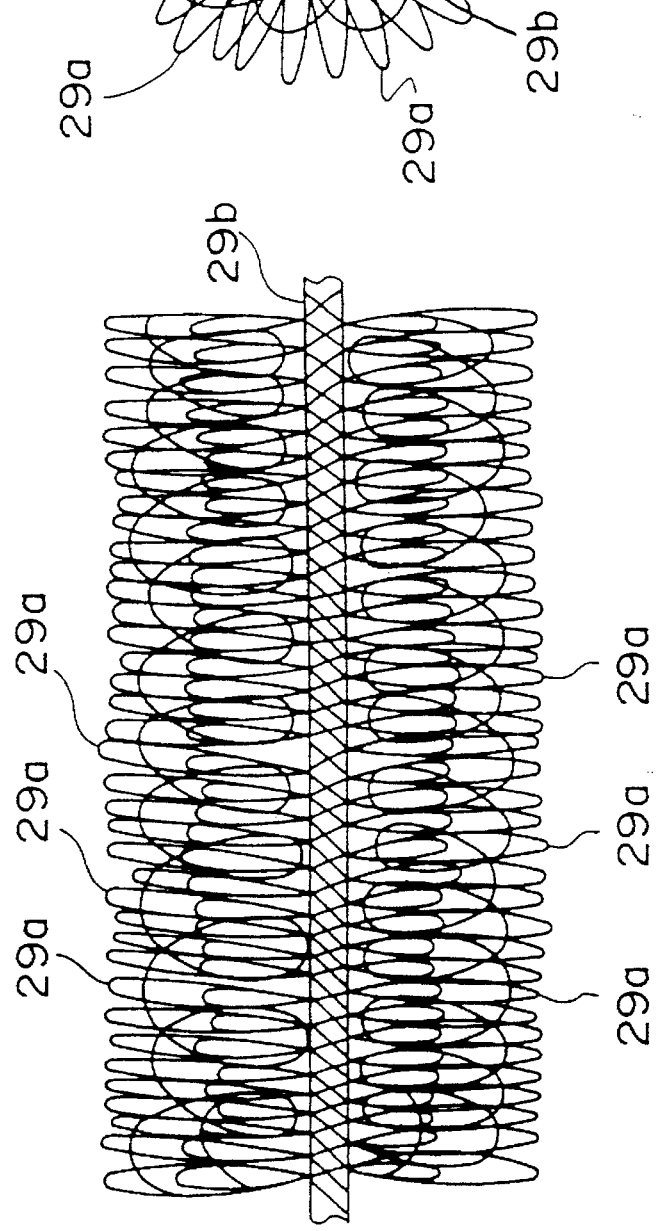
FIG. 4A is a schematic view of a vinylidene chloride filler of a radial ring-like thread assembly form.

The vinylidene chloride fillers 8 have a radial ring-like thread assembly configuration as shown in FIG. 4A and 4B. More specifically, each vinylidene chloride filler 8 comprises a core portion being a cord-like thread body 29b which is knitted from a thick thread. A plurality of ring-shaped portions 29a radially extend from the thread body 29b. The thick thread is formed with a plurality of small holes to provide such a structure as will facilitate microbial growth thereon. The vinylidene chloride fillers 8 are constructed of fine fibers and, therefore, have a large surface area ready to allow microorganisms to deposit and grow thereon. Further, general activated sludge is also very likely to get deposited on the vinylidene chloride fillers 8. As more sludge deposits on the vinylidene chloride fillers 8 which are a radial ring-like thread assembly, dissolved oxygen is less available for supply to the cord-like thread body 29b. Thus, there occurs an anaerobic condition.

Accordingly, on the vinylidene chloride fillers 8 there will propagate anaerobic microorganisms capable of treating organic substances and nitrate nitrogen. That is, as more sludge deposits on the radial ring-like thread assembly or the vinylidene chloride fillers 8, the concentration of anaerobic microorganisms will increase at the vinylidene chloride fillers 8, and thus conditions suitable for anaerobic treatment are created.

The per-day operating time of the sludge separating blower 10, which is connected to the sludge separating diffuser 7, is determined according to the concentration of dissolved oxygen as measured by a dissolved oxygen meter 30B disposed in an anaerobic lower portion K of the first bioreactor 3. That is, when the concentration of dissolved oxygen in the anaerobic lower portion K of the first bioreactor 3 is 0.3 ppm or more, the sludge separating blower 10 will stop running. Therefore, the per-day operating time of the sludge separating blower 10 is very short as compared with the non-operating time of the blower 10.

Masses of microbial sludge containing microorganisms as deposited and propagated on the vinylidene chloride fillers 8 are periodically separated by air discharged from the sludge separating air diffuser 7.

That is, the vinylidene chloride fillers 8 are subjected to aeration by the sludge separating air diffuser 7 twice or so a day, whereby from the vinylidene chloride fillers 8 are separated a mass of aerobic microorganisms deposited densely on the surface of the vinylidene chloride fillers 8 and a mass of anaerobic microorganisms in the interior of the vinylidene chloride fillers 8. As a result of the aeration, a mass of anaerobic microorganisms present inside the vinylidene chloride fillers 8 is separated and crushed, and thus fine anaerobic microorganisms are drawn out from the interior of the vinylidene chloride fillers 8. Thus, the fine anaerobic microorganisms can be effectively utilized for the purpose of denitrification.

Further, air discharged from the sludge separating diffuser 7 serves to change the condition of the anaerobic lower portion K which is anaerobic during most time of the day into an aerobic condition about twice a day. In this way, by changing the condition of the anaerobic lower portion K periodically from anaerobic to aerobic it is possible to prevent the anaerobic lower portion K from being continually kept anaerobic for a prolonged time, thereby preventing gas generation. Thus, an anaerobic microbial sludge is prevented from being caused to move upward within the first bioreactor 3 by a gas generated under anaerobic conditions.

The concentration of microorganisms in an aerobic upper portion G of the first bioreactor 3 is preferably controlled to a level of about 15000 ppm or more in terms of MLSS. Whilst, the concentration of microorganisms in the anaerobic lower portion K of the first bioreactor 3 is preferably controlled to a level of 20000 ppm or more in terms of MLSS. In other words, it is desirable to increase the microbial concentration as much as possible with respect to both the aerobic upper portion G and the anaerobic lower portion K thereby to enable effective treatment of a high-concentration organic waste water.

When a mass of microorganisms deposited on the vinylidene chloride fillers 8 is separated and crushed by aeration, the concentration of microorganisms in a liquid flow portion of the upper portion G of the first bioreactor 3 will be rapidly increased. At this time, in the liquid flow portion there exist not only aerobic microorganisms but anaerobic microorganisms as well. Therefore, with a microbial mixture thus formed in the liquid flow portion of the upper portion G which include all sorts of microbial components of the aerobic and anaerobic microorganisms, it is possible to carry out treatment of not only organic substances but also of nitrate nitrogen (denitrification).

In FIG. 1, reference character 5A designates a circulating air diffuser for the aerobic upper portion G of the first bioreactor 3. The circulating air diffuser 5A is connected to a circulating blower 9 and discharges air supplied from the blower 9. The circulating air diffuser 5A is controlled by a signal given by a dissolved oxygen meter 30A which is disposed in the aerobic upper portion G. When the circulating blower 9 has been stopped for more than 6 hours, the aerobic upper portion G of the first bioreactor 3 can provide a supernatant, and this supernatant is transferred by a lift pump to the relay tank 16. When both the circulating blower 9 and the sludge separating blower 10 are stopped, the interior of the first bioreactor 3 is completely anaerobic and accordingly anaerobic treatment is carried out within the first bioreactor 3.

In the first bioreactor 3 shown in FIG. 1, operation is made on a batch basis so that aerated operation and non-aerated operation are carried out in repeated cycles. The circulating blower 9 and the sludge separating blower 10 are of such operation system that the two units are actuated simultaneously. The concentration of dissolved oxygen in the anaerobic lower portion K is measured by the dissolved oxygen meter 30B so that the sludge separating blower 10 is stopped immediately when the concentration of dissolved oxygen in the anaerobic lower portion K has reached 0.3 ppm or more. Separation of microbial sludge from the vinylidene chloride fillers 8 and crushing of microbial masses are completed in a short time (5 to 10 minutes). Therefore, no particular problem is involved even when the sludge separating blower 10 stops running in a short time.

Referring again to FIG. 1, numeral 4 designates a separation wall. The separation wall 4 has a triangular sectional configuration which is inwardly tapered. In the aerobic and anaerobic portions of the upper portion G of the first bioreactor 3, the separation wall 4 serves to prevent a circulated water stream in the upper portion G from entry into the lower portion K. Since the circulating air diffuser 5A is disposed on the separation wall 4, it is possible to expect that the separation wall 4 will effectively prevent the circulated water stream in the upper portion G from entering the lower portion K. Therefore, necessary inward projection of the separation wall 4 is held to minimum. More specifically, where the first bioreactor 3 has a size of 1 m in width, 2 m in depth, and 2 m in height, the projection of the separation wall 4 is 10 cm from its base. Generally, a required projection of the separation wall 4 is dimensionally of the order of 5 to 10% of the width or depth of the first bioreactor 3. It is noted that the separation wall 4 is of such a triangular shape contoured along a reactor wall as shown in FIG. 1 or is a flat plate-like projection.

An uppermost portion U of the first bioreactor shown in FIG. 1 is a space for passage of an exhaust gas originating in production equipment. This uppermost portion U is connected to a nutrient tank 12 via a nutrient pump 13. A nutrient is supplied from the nutrient tank 12 into the uppermost portion U. The nutrient includes phosphoric acid. The phosphoric acid-containing nutrient serves for normal propagation of aerobic and anaerobic microorganisms living in the first bioreactor 3 and also for maintenance of microbial subsidence.

In addition to the nutrient tank and pump, a hydrogen donor tank (not shown) and a hydrogen donor pump (not shown) are disposed for supply of hydrogen donors to the uppermost portion U. For hydrogen donor, alcohols are generally used which are effective for denitrification in the portion G of the first bioreactor 3.

In FIG. 1, numeral 15 designates an exhaust gas blower. The exhaust gas blower 15 delivers exhaust gases accumulated in the uppermost portion U of the first bioreactor 3 toward the second bioreactor 18. Exhaust gases accumulated in the uppermost portion U include acidic and organic exhaust gases which originate in the production equipment and require treatment, and an odoral gas generated within the first bioreactor 3 itself.

The reason why an odoral gas is generated in the first bioreactor 3 itself is that operation of the first bioreactor 3 requires exceptionally high concentration conditions with respect to microorganisms as about 15000 ppm or more in terms of MLSS, and that operation requires an anaerobic condition and an aerobic condition to be repetitively generated.

However, since the upper portion G of the first bioreactor 3 is in an aerobic condition, the quantity of odoral gas generated from the first bioreactor 3 is insignificant as compared with the quantity of odoral gas generated from any conventional anaerobic tank. Although anaerobic microorganisms are utilized in the first bioreactor 3, the upper portion G is kept in an aerobic condition and, therefore, generation of an odoral gas can be minimized.

Aforesaid exhaust gases including an odoral gas and organic exhaust gases are discharged by means of the exhaust gas blower 15, from the uppermost portion U and through an exhaust gas diffuser pipe 19 disposed in a lower portion of the second bioreactor 18. It is necessary that the exhaust gas blower 15 be constructed of a material having good durability against the action of acids, alkalis, and organic solvents.

A supernatant is delivered on a batch basis from the first bioreactor 3 to the relay tank 16 shown in FIG. 1, in a short time period of one hour or less. The relay tank 16 stores the supernatant therein and it also supplies the supernatant so stored to the second bioreactor 18. For this supply a relay pump 17 is so controlled that the supply of supernatant per unit time is equalized as much as possible. From the view points of high-standard treatment of TMAH in the second bioreactor 18, treatment of trace amounts of surfactant, and BOD and SS (suspended solid) treatment, supply of the water to be treated, from the relay pump 17 to the second bioreactor 18, should be distributed at uniform time intervals as much as possible. By so arranging it is possible to enhance the treating capability with respect to the water to be treated.

The second bioreactor 18 includes layers of charcoal 20 and calcium carbonate fillers 21 which are packed in a net 22. The charcoal 20 and calcium carbonate fillers 21 are stacked in vertically alternate layers in the net 22.

In the present embodiment, for the charcoal 20 a typical "Binchotan" (trade name) charcoal is used. For the calcium carbonate fillers 21 is used a typical oyster shell. Since both "Binchotan" charcoal and oyster shells are natural products, they include many pieces of indefinite shapes. Therefore, when exhaust gases flow upward from the lower portion of the second bioreactor 18 to the upper portion, it is expectable that the exhaust gases will surely come into contact with the "Binchotan" charcoal and oyster shells to undergo treatment. Since the two kinds of fillers, namely, "Binchotan" charcoal and oyster shell, are natural products, they provide better access for microbial deposition and propagation than such artificial materials as vinyl chloride and plastic materials.

Air discharged from the exhaust gas diffuser pipe 19 contains exhaust gases originating in production equipment at a semiconductor plant and/or a liquid crystal plant, and an odoral gas generated from the first bioreactor 3 as a waste water treating unit. Specifically, exhaust gases originating in such production equipment include, for example, acidic, alkaline, and organic gases. Of these gases, particularly preferred for choice are gases containing organic components. The reason is that gases containing organic components serve as a source of nutrient for microorganisms that propagate on charcoal 20 and calcium carbonate fillers 21 as already stated. For example, an analysis of an odoral gas generated from the first bioreactor 3 tells that the gas contains trace amounts of ammonia, hydrogen sulfide, methyl mercaptan, methyl sulfide, and trimethylamine.

Exhaust gases generated from production installations at aforesaid types of plants are collected by an exhaust fan (not shown), which are then directed to the uppermost portion U of the first bioreactor 3 via an exhaust duct 26. Then, the exhaust gases so directed will get mixed with an odoral gas generated from the first bioreactor 3, with the result that they have a gain in their content of organic substances. The resulting mixture of aforesaid exhaust gases and odoral gas is directed by the exhaust gas blower 15 into contact with biological membranes formed and grown on the surfaces of fillers in the second bioreactor 18, being thus microbially treated.

Generally, at plants where mineral acids, such as hydrofluoric acid, are used in large quantities, hydrogen fluoride gas and the like are produced. In the past, it was not possible to microbially treat exhaust gases originating in mineral acids, because such gases contain little organic components. In the embodiments of the present invention, however, exhaust gases originating in mineral acids are mixed with an odoral gas that is an organic matter, being thus changed into a gas with a property adapted for easy microbial treatment. Therefore, even such exhaust gases are microbially treated. To explain this more specifically, the term "mineral acid gas" means a gas represented by hydrogen fluoride gas which is usually acidic. Since a mineral acid gas is acid, conventionally such a gas cannot be microbially treated. Therefore, exhaust gases containing such mineral acid have been treated with water or by means of an alkali scrubber. However, by turning the property of such exhaust gas into one close to neutral, it is possible to change the exhaust gas into a microbially treatable gas.

Waste water containing developer is often within a pH range of 6.5 to 8.5 in the first bioreactor 3, and an exhaust gas generated therefrom has a similar characteristic. As may be well appreciated from the fact that waste water containing developer is known as "organic alkali" alias, exhaust gases therefrom contain organic matter including odoral gas components. Therefore, by diluting a mineral acid gas with an organic gas for neutralization, it is possible to change the mineral acid gas into a gas adapted for ready microbial treatment. Further, because of the fact that the microbial concentration within the first bioreactor 3 is comparatively high, it is likely that odoral gases containing organic matter will be generated from the first bioreactor. Fluorine in aforesaid hydrogen fluoride gas will chemically react with the calcium in the calcium carbonate fillers 21 to produce calcium fluoride. In this way, according to the embodiment of the invention, it is possible to positively effect chemical treatment of exhaust gases containing a mineral acid gas.

In the present embodiment, for the charcoal 20 used as fillers for placement in the second bioreactor 18, "Binchotan" charcoal is selected which has a specific gravity of more than 1. Among various kinds of charcoal, "Binchotan" charcoal is a unique type of charcoal which sinks when placed into water and is not liable to its body being crushed when exposed to aeration under strong air current. In contrast to this, the other types of charcoal have a disadvantage that the body of the charcoal is crushed in part under strong aeration so that the crushed part may be contained in treated water, thus increasing the value of SS (suspended solid) which is one of control items with respect to effluent quality. "Binchotan" charcoal has a large volume density, is rigid, and is unlikely to become crushed. Therefore, it serves well for a prolonged use of more than 5 years, involving no problem whatsoever.

The value of influent load relative to the second bioreactor 18 may vary depending upon kinds and concentrations of persistent surfactant and nitrogen compounds contained in the water to be treated, and also depending upon the target quality of treated water. However, if the time for catalytic reaction within the second bioreactor 18 is set as 6 hours or more, trace amounts of surfactant and nitrogen compounds in the waste water to be treated can be effectively treated.

The quantity of exhaust gas emission varies according to the components and concentration of exhaust gas and odoral gas, but the second bioreactor is more effectively designed so that it can be 40 cubic meter or less per day per cubic meter of the capacity of the filler portion R as contact circulation portion, or volume of charcoal and calcium carbonate fillers. However, this is not absolute condition. For the air to be discharged from the circulation diffuser 5B for tank interior agitation, 60 cubic meter per day or more is required for 1 cubic meter of the tank capacity.

Charcoal 20 and calcium carbonate fillers 21 are accommodated in the net 22. The material of the net 22 is not particularly limited, it being only required that it be suitable for packing the charcoal 20 and calcium carbonate fillers 21. The material may be polyethylene or other resin. Needless to say, the net 22 may be a stainless steel made basket.

"Binchotan" charcoal chosen for charcoal 20 is a Japanese traditional charcoal and refers to a white charcoal of "Ubamegashi", a kind of oak tree. Being a white charcoal, "Binchotan" charcoal is a charcoal carbonized at about 1000° C. or so and is classified as a high-temperature carbonized charcoal. The charcoal used in one experimental example of the invention is preferably a "Binchotan" charcoal of 4 to 6 cm in diameter and 5 cm or more in length, when contact agitation within the second bioreactor 18 is considered. However, this is not an absolute condition. Insofar as a "Binchotan" charcoal of some reasonable size is used, there is no possibility that it is washed away from the second bioreactor 18 during the process of aeration. Therefore, for the convenience of management, it is preferred that the "Binchotan" charcoal is of a large size. Since, as above stated, "Binchotan" charcoal has a specific gravity of more than 1, it settles in water and is almost unlikely to become crushed under any strong aeration. Therefore, "Binchotan" charcoal is more suitable for use as fillers for high-level waste water treatment than any other kind of charcoal.

According to this first embodiment, an upward water current is generated by air discharged from the circulation diffuser 5B within the second bioreactor 18. The interior of the second bioreactor 18 is further mixed and agitated by air discharged from the exhaust gas diffuser 19. Although surfactant bubble on water surface, the water surface of the second bioreactor 18 of this first embodiment is agitated by two types of air for the most part and, therefore, no space is available which allows such bubbling. Thus, it is possible to effectively treat bubbles themselves. Aforesaid two types of air refer to air discharged from the circulation diffuser 5B and exhaust gas-containing air discharged from exhaust gas diffuser 19.

Figure 9:
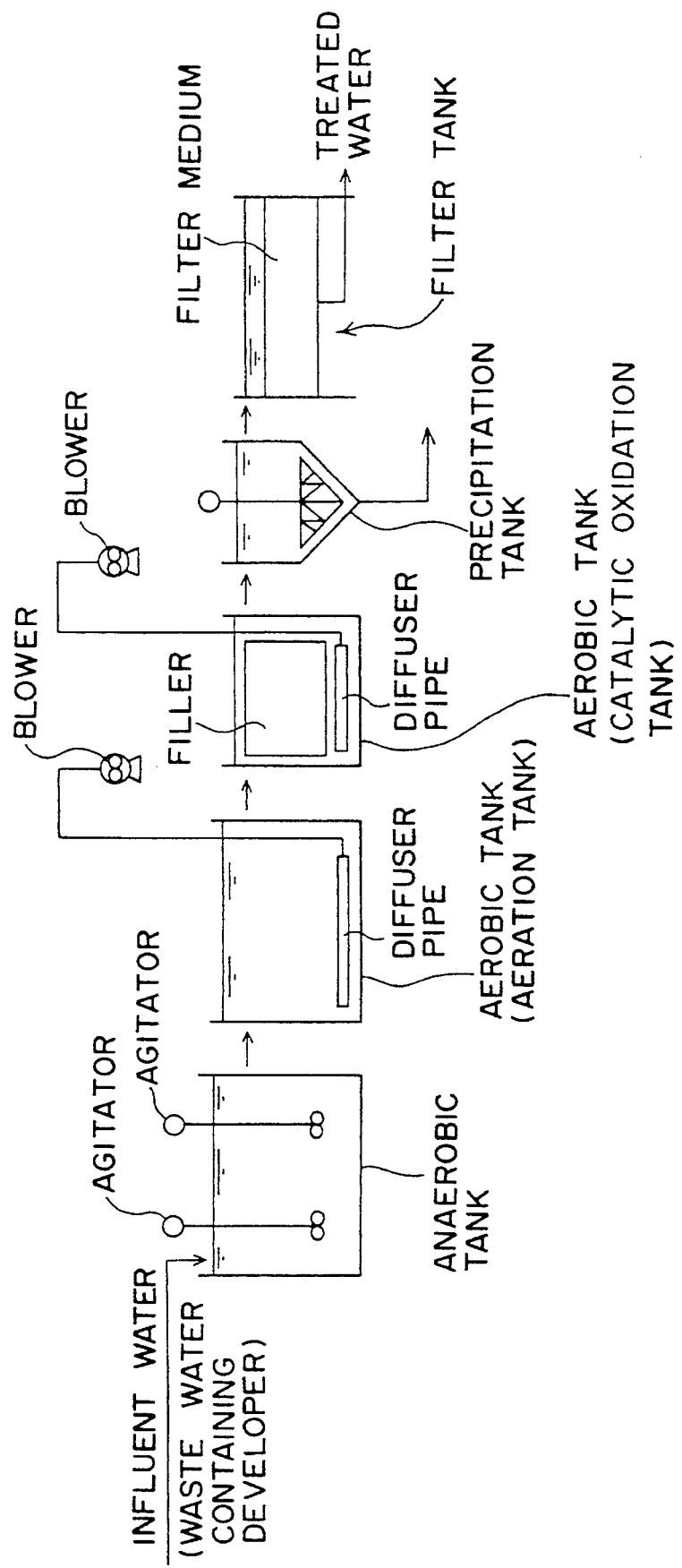
FIG. 9 is an illustration which schematically shows a conventional waste water treatment apparatus.
Figure 10:
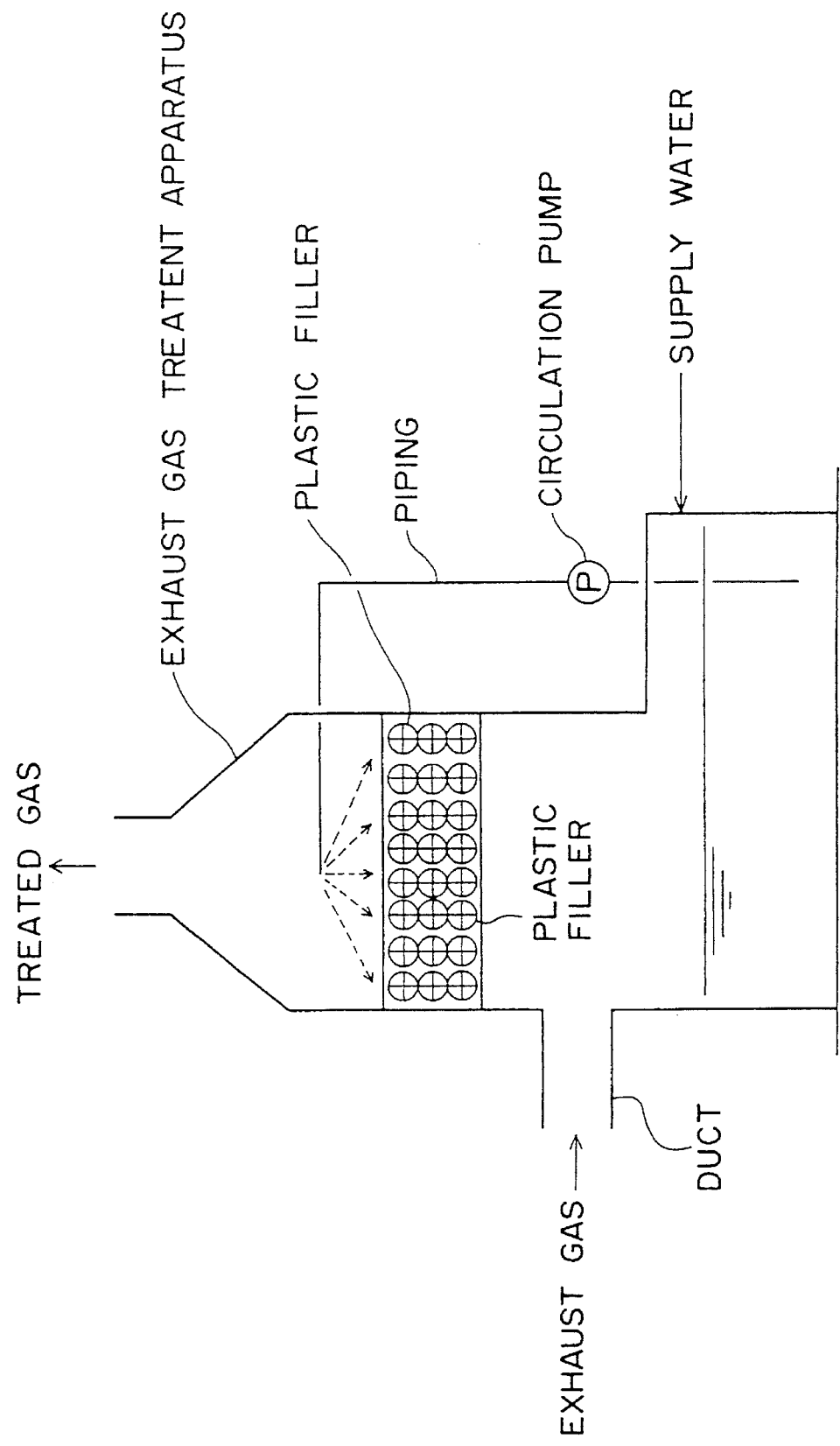
FIG. 10 is a view schematically showing a conventional exhaust gas treatment apparatus.
Figure 11A:
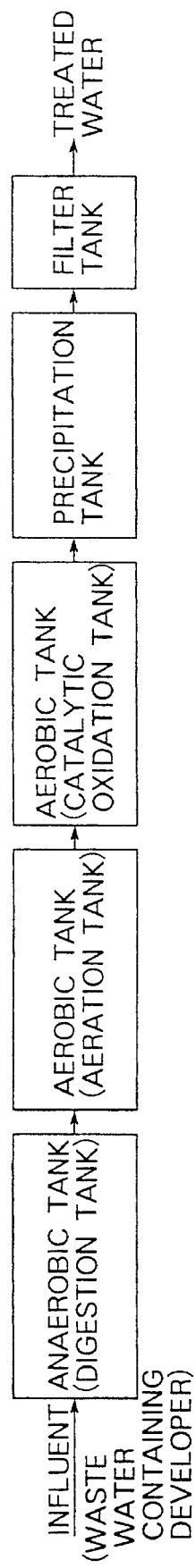
FIG. 11A is a system diagram for the conventional waste water treatment apparatus.
Figure 11B:
FIG. 11B is a system diagram for the conventional exhaust gas treatment apparatus.

In this embodiment, oyster shell is chosen for the calcium carbonate fillers 21; but for the calcium carbonate fillers 21 may be chosen coral or "Kansuiseki" (trade name) limestone or marble. However, oyster shell is most economical for the calcium carbonate fillers 21. Oyster shells, which have been left on land for about one year and is odor-free, should be chosen for the calcium carbonate fillers 21. Oyster shells have a surface suitable for microbial growth and biological membrane formation. The water being treated is caused by the circulation diffuser 5B to flow in circulation so as to repetitively pass through the filler portion R which functions as the contact circulation portion. Therefore, the water being treated is biologically filtered by microorganisms as propagated on oyster shell surfaces. According to this embodiment, therefore, the filter tank in the prior art arrangement as shown in FIG. 9 is not required.

In FIG. 1, numeral 23 designates a precipitation tank. A collector 24 is provided in the precipitation tank 23. The water to be treated, from the second bioreactor 18, is directed into the precipitation tank 23 in which the water is subjected to solid-liquid separation. Microbial sludge settled in the precipitation tank 23 is returned to the first bioreactor 3 by a sludge return pump 25.

Figure 3:
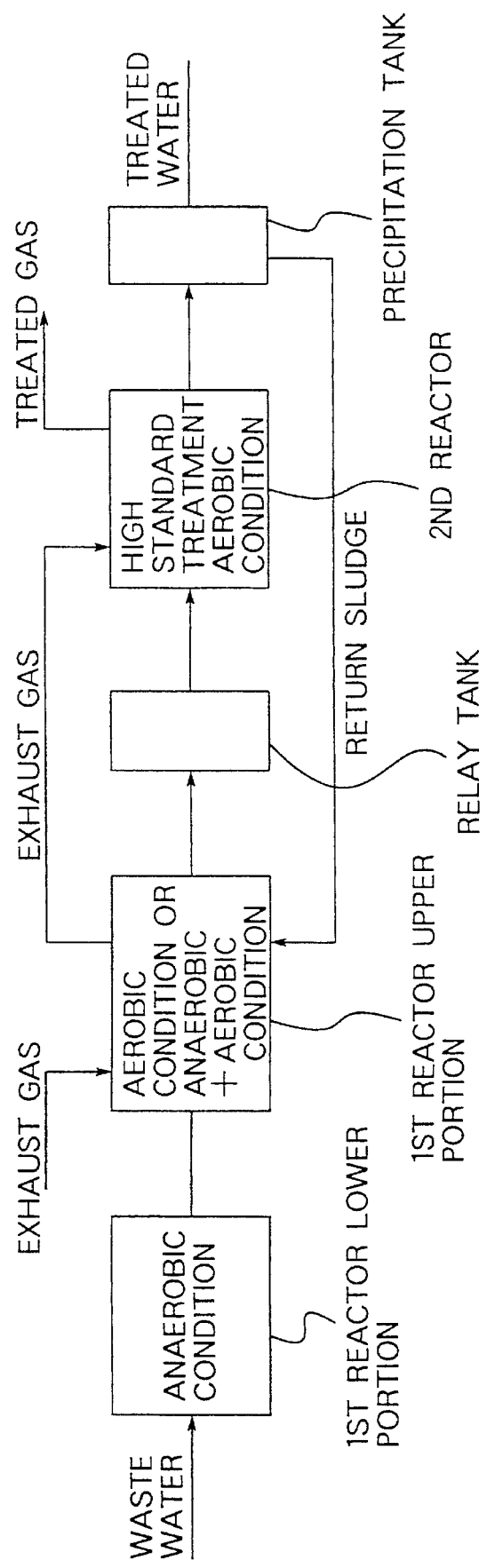
FIG. 3 is a flow chart explanatory of the treatment process involved in the first and second embodiments.

Thus, according to this first embodiment, as FIG. 3 flow diagram for waste water treatment shows, organic substances contained in the water to be treated are digested by anaerobic microorganisms in the lower portion K of the first bioreactor 3. Then, nitrogen compounds contained in the water to be treated are digested by aerobic microorganisms in the upper portion G of the first bioreactor 3. Then, the water being treated is denitrified by anaerobic microorganisms in the upper portion G of the first bioreactor 3. In the second bioreactor 18, chemical substances, such as persistent surfactant, which are contained in the water to be treated and are generally difficult to microbially decompose, are aerobically biodecomposed by microorganisms which have propagated in biological membranes formed on the surface and interior of "Binchotan" charcoal and oyster shells packed in the contact circulation portion R.

As shown in FIG. 3, according to this first embodiment, odoral gas generated in the first bioreactor 3 itself, and acidic exhaust gas, alkali gas, and organic gas which are exhaust gases originating in production equipment, are mixed together, and the mixture is introduced into the second bioreactor 18 by the exhaust gas blower 15. The odoral gas and exhaust gases are microbially treated by microbial membranes formed on the surface of "Binchotan" charcoal and oyster shells.

In this first embodiment, the first bioreactor 3 includes a lower portion K as anaerobic treating portion, and an upper portion G having a combination of aerobic and anaerobic treating functions. Therefore, with a smaller number of tanks as compared with the prior art arrangement, it is possible to carry out both anaerobic and aerobic treatments.

Therefore, according to this first embodiment, it is possible to treat high-concentration waste water containing nitrogen-containing persistent chemical substances represented by TMAH and also containing surfactant, simultaneously with trace amounts of exhaust gases. Therefore, according to the embodiment, it is possible to positively obtain treated water harmless to a bioecological system inhabiting environmentally favorable effluent areas, and also odor-free treated gas. Furthermore, a waste water treatment apparatus can be obtained which is simple in construction and affords ease of maintenance.

A comparison between the prior art arrangement and the first embodiment of the invention tells that the first bioreactor 3 of the first embodiment can exhibit functions of both the anaerobic tank (digestion tank) and the aerobic tank (aeration tank) of the prior art. Further, the upper portion G has a function to perform further treatment by anaerobic microorganisms, that is, a denitrification function with respect to total nitrogen. The second bioreactor 18 of the first embodiment can exhibit functions of both the aerobic tank (catalytic oxidation tank) and the filter tank of the prior art shown in FIG. 9.

FIG. 5 shows an operating status in a day of respective blowers and pumps in the above described first embodiment. As shown in FIG. 5, the circulation blower 9 of the first bioreactor 3 operates for 12 hours in a day, and the separating blower 10 operates twice a day, say, at the beginning and at the end of the time period in which the circulation blower 9 is in operation, each time for 10 minutes only. The storage pump 2, the nutrient pump 13, and the return pump 25 of the precipitation tank 23 each operate for 10 minutes only once a day at the same time. Lift pump 14 operates only once a day, for 10 minutes, during the time period in which the blowers 9, 10 and pumps 2, 13 are at a halt, and immediately before the circulation blower 9 starts operation. The exhaust gas blower 15, the relay pump 17, and the circulation blower 11 of the second bioreactor 18, and the collector 24 of the precipitation tank 23 are all in continuous operation all day.

Second Embodiment

Figure 2:
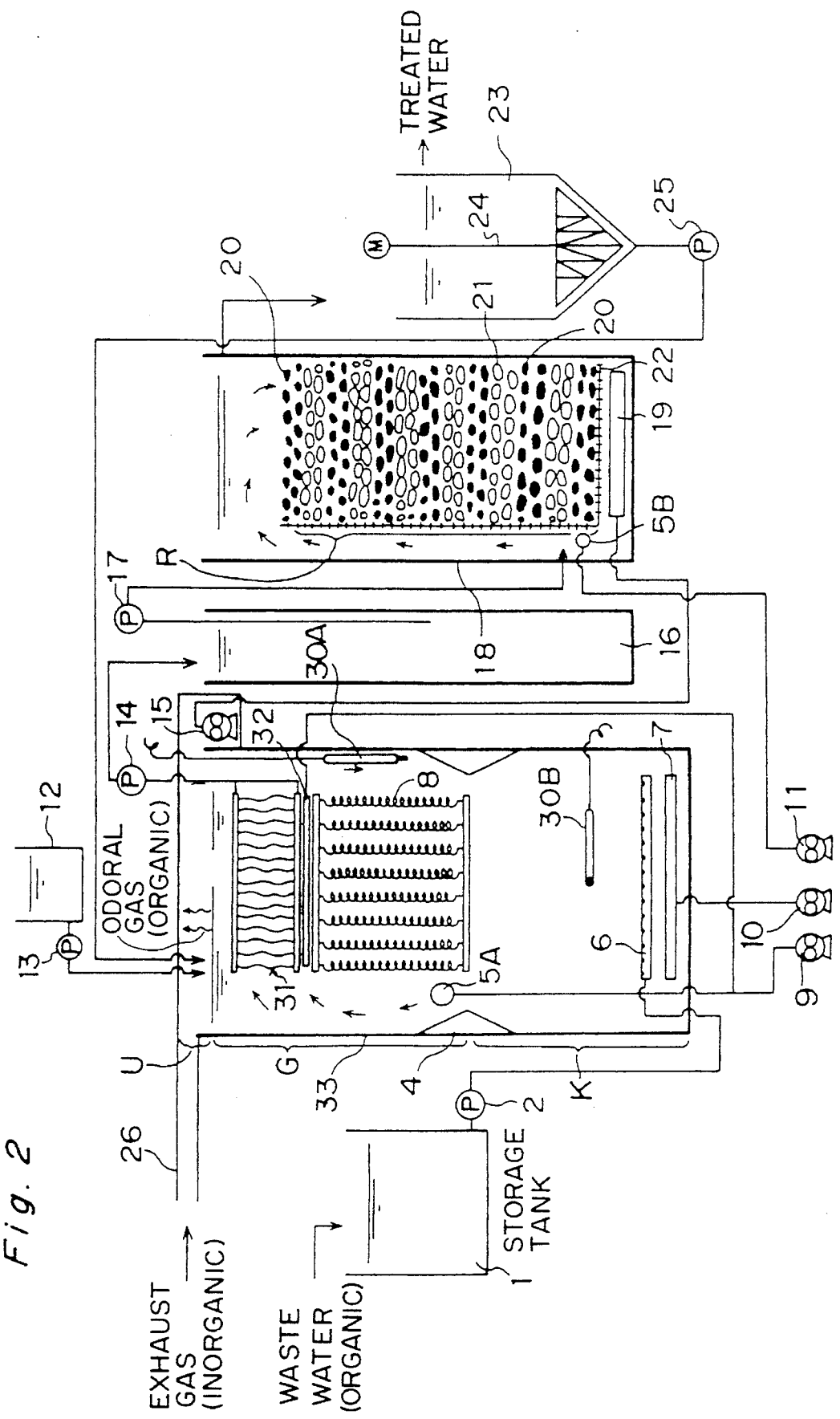
FIG. 2 is an illustration which schematically shows a second embodiment of the apparatus for waste water treatment according to the invention.

FIG. 2 shows a second embodiment of the waste water treatment apparatus in accordance of the invention. This embodiment differs from the first embodiment only in that a membrane filter 31 and a filter membrane air diffuser 32 for cleaning the membrane filter are arranged between an uppermost portion U of the first bioreactor and the upper portion G. Therefore, this second embodiment will be described with emphasis upon the membrane filter 31 and the filter membrane air diffuser 32.

Whereas the first bioreactor 3 in the first embodiment is of the batch system, the first bioreactor 33 in this second embodiment is of the continuous treating system. In the second embodiment, treated water from the first bioreactor 33 is constantly drawn continuously using the membrane filter 31.

In this second embodiment, in order to prevent jamming of the membrane filter 31 due to microorganisms, the membrane filter 31 is constantly cleaned by air discharged from a filter membrane diffuser 32. Therefore, according to the second embodiment, any possible decrease in the quantity of treated water which is attributable to jamming of the membrane filter 31 is controlled to the minimum possible limit.

As FIG. 2 shows, the membrane filter 31 comprises a plurality of membranes arranged in laterally spaced apart relation between upper and lower plates.

For the membrane filter 31, several types of membranes are known including hollow thread membrane and flat sheet membrane, any of which may be chosen for use. What is important is that the surface of the membrane filter 31 be constantly cleaned with air. In the past, the use of a membrane filter involved the problem of jamming at the membrane filter. However, according to this second embodiment, wherein the membrane filter 31 is constantly cleaned with air, the membrane filter is prevented from jamming.

In the first bioreactor 33 of the second embodiment, a high-concentration organic waste water, such as waste water containing developer, is subjected, as a first step, to digestive treatment by anaerobic microorganisms in the lower portion K and, as a second step, to treatment by aerobic and anaerobic microorganisms in the upper portion G. Thereafter, the water so treated is passed through the membrane filter 31 for a third step treatment. Therefore, according to this second embodiment, a synergistic effect of the above three steps is obtainable such that filter clogging with respect to the membrane filter 31 can be highly inhibited.

In brief, as seen from FIG. 2, the apparatus of the second embodiment includes membrane filter 31, and this enables water being treated to be drawn continuously from within the first bioreactor 33 through the membrane filter 31. Since the membrane filter 31 is cleaned by means of the filter membrane air diffuser 32, even if the concentration of microorganisms within the first bioreactor is made higher than that in the first embodiment, the membrane filter will not become clogged. This means that in the second embodiment the microbial concentration (MLSS concentration) can be successively made higher as compared with that in the first embodiment.

Specifically, in the second embodiment, the concentration of microorganisms in the upper portion G of the first bioreactor 33 may be arranged to be 25000 ppm or more and the concentration of microorganisms in the lower portion K to be 35000 ppm or more. Therefore, the apparatus of the second embodiment provides even higher treatment efficiency than the first embodiment. In the second embodiment, the interior of the first bioreactor 33 is in a muddy condition, if described in straightforward terms, such that there are present exceptionally larger varieties of anaerobic and aerobic microorganisms than in the prior art, with an exceptionally higher microbial concentration as compared with conventional treating methods.

Therefore, according to this second embodiment, it is possible to treat high-concentration waste water containing nitrogen-containing persistent chemical substances represented by TMAH and also containing surfactant, simultaneously with trace amounts of exhaust gases, and particularly to a high standard. Therefore, according to the embodiment, it is possible to positively obtain treated water harmless to a bioecological system inhabiting environmentally favorable effluent areas, and also odor-free treated gas. Furthermore, the waste water treatment apparatus is simple in construction and affords ease of maintenance.

FIG. 6 shows an operating status in a day of respective blowers and pumps in the above described second embodiment. As shown in FIG. 6, the circulation blower 9, storage pump 2, nutrient pump 13, lift pump 14, and exhaust gas blower 15 of the first bioreactor 33, the relay pump 17, and the circulation blower 11 operate all day. Separating blower 10 operates only 10 minutes every 12 hours in a day. Return pump 25 of the precipitation tank 23 operates only once a day when the separating blower 10 of the first bioreactor 33 is not in operation. Collector 24 is also in operation all day.

A supplementary explanation is made with respect to a common aspect of the first and second embodiments that aerobic and anaerobic microorganisms are present in combination.

Generally, where microorganisms are in high concentration, if aeration is stopped, there will occur an anaerobic condition in a short time. The object of controlling the air supply agitation means (blower) to high/low level is to control the quantity of dissolved oxygen in the first bioreactor by the quantity of air involved in aeration. Therefore, in an anaerobic condition in which the concentration of microorganisms is exceptionally high, the quantity of dissolved oxygen will decrease when the blower is operated at a low rotational speed. The reason is that the oxygen consumption of microorganisms is greater than the supply of oxygen by the blower. Therefore, the quantity of dissolved oxygen in the first bioreactor is reduced to zero in course of time. If a biological membrane deposited on vinylidene chloride fillers is so thick that the interior thereof is constantly in an anaerobic condition, the concentration of microorganisms is exceptionally high just after the biological membrane is disrupted, so that an anaerobic condition is drawn from the biological membrane. The relationship between aeration and dissolved oxygen is shown in FIG. 7. In the case of the batch-system first embodiment, wherein the concentration of MLSS in the upper portion of the first bioreactor is 15000 ppm, the quantity of dissolved oxygen in the first bioreactor upper portion is 1.5 ppm or less under aerated conditions. With the blower constantly kept in operation at a controlled (e.g., invertor-controlled) rotational speed, the quantity of dissolved oxygen will be reduced to a level close to 0 ppm. In the second embodiment, which is of the continuous system, the concentration of MLSS in the upper portion of the first bioreactor 33 is 25000 ppm and, therefore, the quantity of dissolved oxygen is 1.0 ppm or less under aerated conditions. In the continuous system second embodiment, wherein the concentration of microorganisms is higher than in the first embodiment which is of the batch system, it is possible to reduce dissolved oxygen to a level close to 0 ppm.

In the first and second embodiment, when a condition in which aerobic and anaerobic microorganisms are present in mixture is created while aeration is carried out, the aeration is intended essentially for agitation. The condition in which aerobic and anaerobic microorganisms are present in mixture is created while the quantity of dissolved oxygen is controlled to a low level. In this case, aerobic microorganisms will not immediately die out even under anaerobic conditions but some type of such microorganisms will continue to live for a few hours. Especially, in the first embodiment in which waste water containing developer is treated on a batch basis, aerobic microorganisms will continue to live without difficulty even when anaerobic conditions last for more than 12 hours. Therefore, with the concentration of microorganisms increased to an exceptionally high level, the quantity of dissolved oxygen is gradually reduced and, when it approaches zero, biological membranes are separated and crushed so that anaerobic microorganisms are drawn out, it being thus possible to quickly create an anaerobic condition in which aerobic microorganisms are alive (a condition in which aerobic and anaerobic microorganisms are present together).

Whilst, through continuation of an aerating operation, the quantity of dissolved oxygen will increase with the lapse of time, with the result that biological membranes and sludge again deposit on the vinylidene chloride fillers and, at the same time, anaerobic microorganisms are accommodated in the interior of biological membranes on the vinylidene chloride fillers. It is noted that anaerobic microorganisms will not immediately die out under aerobic conditions.

In essence, in order that a condition in which aerobic and anaerobic microorganisms are present in mixture may be created, it is necessary that (a) the concentration of microorganisms be exceptionally high so that an anaerobic condition is prevalent; that (b) the operation of the agitation aeration blower (air supply agitator means) can be controlled to high or low (as by invertor); and that (c) there should be fillers, such as vinylidene chloride fillers, on which a thick biological membrane is likely to be formed which is internally in an anaerobic condition.

With mere separation of biological membranes from the vinylidene chloride fillers, anaerobic microorganisms contained in such membrane are not yet ready to serve for microbial treatment, since the anaerobic microorganisms have not yet been formed into fine flocks. In order that the anaerobic microorganisms may well serve for microbial treatment, it is necessary that the biological membrane be separated from the vinylidene chloride fillers and that the separated biological membrane be crushed into fine flocks of anaerobic microorganisms.

Next, an experimental example based on the above described second embodiment will be explained.

The first bioreactor was constructed to have a size of 1 m×2 m×2 m, and the second bioreactor was constructed to have a size of 1 m×1.5 m×1.7 m. Waste water containing developer was introduced into the first and second bioreactors and a trial operation was carried out for about two months. For the charcoal was used "Binchotan" charcoal, produced through the process of carbonization at about 1000° C. For the oyster shells were used oyster shells of Toba (Mie-ken) in Japan origin which had been left ashore for one year. From the outset of trial operation, residential surplus sludge was introduced to find that microbial sludge deposited on vinylidene chloride fillers 8 within the first bioreactor. After lapse of more than one month, something like a biological membrane was formed to a slight degree on the surfaces of "Binchotan" charcoal and oyster shells within the second bioreactor, though there was seen no change with the charcoal and oyster shells. The biological membrane was a unique, thin biological membrane based on charcoal and oyster shells and was not so thick as those which are generally seen on contactors generally used in waste water treatment under such a process as a rotating plate process or a submerged biofilter process.

After the end of the trial run, measurement was made of the quality of the waste water prior to its entry into the first bioreactor, that is, the water quality of the storage tank 1, and the quality of treated water, that is, water quality at the outlet port of the precipitation tank 23, over a period of 3 days. The measured data are summarized as follows. Measurement was also made with respect to exhaust gases, the results of which are shown below.

Water quality at the inlet of 1st bioreactor

| pH | 12.3 or lower |
| BOD | 2800 ppm or below |
| TMAH | 4400 ppm or below |
| SS | 35 ppm or below |
| Ammonia nitrogen | 1 ppm or below |
| Nitrite nitrogen | 1 ppm or below |
| Total nitrogen | 650 ppm or below |
| Cationic surfactant | 33 ppm or below |
| Anionic surfactant | 6 ppm or below |

Water quality at the outlet of precipitation tank

| BOD | 10 ppm or below |
| TMAH | 1 ppm or below |
| SS | 10 ppm or below |
| Ammonia nitrogen | 1 ppm or below |
| Nitrite nitrogen | 1 ppm or below |
| Total nitrogen | 96 ppm or below |
| Cationic surfactant | 0.4 ppm or below |
| Anionic surfactant | 0.2 ppm or below |

As may be appreciated from the foregoing results, the water quality at the outlet of the waste water treatment apparatus witnessed high removal percentages, namely, more than 99% in TMAH, more than 99% in BOD, more than 80% in total nitrogen, and more than 95% in surfactant. It may be noted that the regulation standard value with respect to total nitrogen is generally not more than 120 ppm maximum per day, though it varies among industries subject to the regulation.

Measurement was also made with respect to exhaust gases and odoral gas and the following results were obtained.

Exhaust gas, odoral gas concentration at the inlet of 2nd bioreactor

| Hydrogen fluoride (exhaust gas) | 13 ppm or less |
| Odor concentration (odoral gas) | 47 or below |

Exhaust gas, odoral gas concentration at the outlet of 2nd bioreactor

| Hydrogen fluoride (exhaust gas) | 1 ppm or less |
| Odor concentration (odoral gas) | 17 or below |

As may be understood from the above results, the exhaust gas and odoral gas concentrations at the outlet of the second bioreactor witnessed a removal ratio of more than 60% relative to the concentration at the inlet.

Third Embodiment

Figure 8:
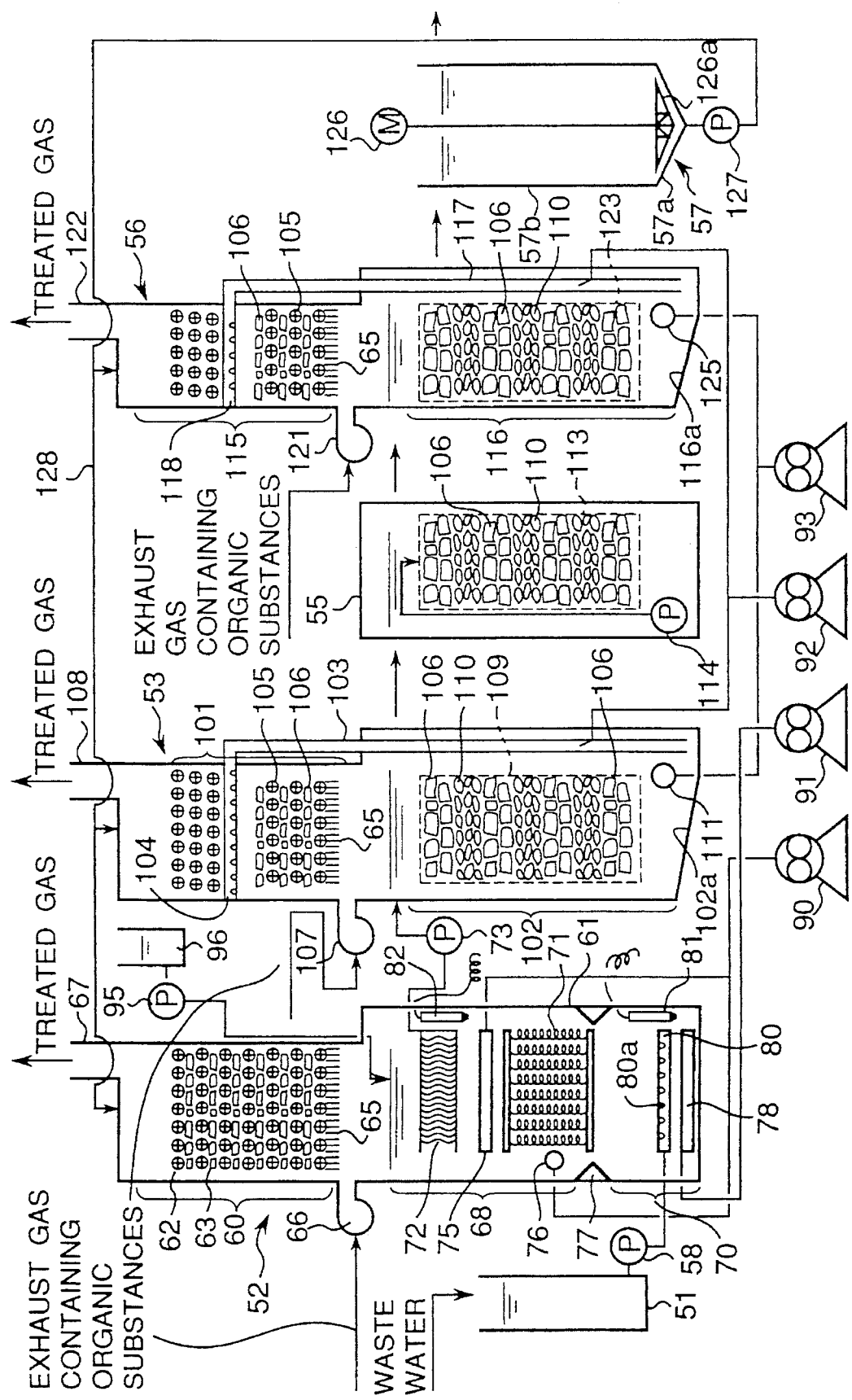
FIG. 8 is a schematic drawing of a third embodiment of the waste water treatment apparatus of the present invention.

Next, a third embodiment of the present invention is shown in FIG. 8. The third embodiment is an apparatus which can treat high-concentration waste water containing developer, which includes nitrogen, surfactant, colored components and the like, and exhaust gas including organic substances. The third embodiment adopts a treating method to continuously treat waste water containing developer and exhaust gas containing organic substances.

As shown in FIG. 8, the third embodiment comprises a storage tank 51, a first bioreactor 52, a second bioreactor 53, a denitrification tank 55, a third bioreactor 56 and a precipitation tank 57.

In the storage tank 51, high-concentration waste water containing developer which is discharged from a semiconductor plant or a liquid crystal plant is stored. A storage tank pump 58 is connected to this storage tank 51. The storage tank pump 58 is used for sending waste developer, which is stored in the store tank 51, to the first bioreactor 52.

The first bioreactor 52 is provided with a first reaction sprinkle portion 60 as a first upper wetting portion and a first lower submerged portion 61. The first reaction sprinkle portion 60 has plastic fillers 62 and charcoal 63 which are alternately stacked in the vertical direction. In this embodiment, "Binchotan" charcoal with 4 to 6 cm or more in diameter and 5 cm or more in length is employed as charcoal 63. A lattice plate 65 is fixed at the bottom of the first reactor sprinkle portion 60. This lattice plate 65 supports the plastic fillers 62 and charcoal 63, and also has a function of passing liquid and gas freely. Specifically, commercially available grating for heavy weight and the like can be selected as this lattice plate. An exhaust gas fan 66 is placed at the bottom of the first reaction sprinkle portion 60. This exhaust fan 66 introduces exhaust gas containing organic substances into the above-mentioned bottom portion. Exhaust gas introduced into the bottom portion passes through the lattice plate 65, the plastic fillers 62 and the charcoal 63, and is discharged from an exhaust portion 67 of the uppermost portion of the first bioreactor 52.

On the other hand, the first lower submerged portion 61 of the first bioreactor 52 has a first aerobic contact circulation portion 68 and a lower anaerobic portion 70. A separation wall 77 is fixed on the side wall of the tank between the first contact circulation portion 68 and the anaerobic portion 70.

This separation wall 77 clearly separates the first circulation contact portion 68 from the anaerobic portion 70. This separation wall 77 appropriately extrudes inwardly by about 10 centimeters from the side wall when the dimension of the first lower submerged portion 61 is about 1 m in width, 2 m in depth, 2 m in height, for example. Generally, an extruded dimension of the separation wall 77 is about 5 to 10% of width or depth of the submerged portion 61.

The upper, first contact circulation portion 68 has vinylidene chloride fillers 71. The vinylidene chloride fillers 71 have the same structure as a vinylidene chloride filler 29 shown in FIG. 4A and 4B, and have a large surface area so that microorganisms can easily grow. Even general activated sludge can easily be attached to this vinylidene chloride fillers 71. The more sludge is attached to this vinylidene chloride fillers 71, the more difficult it becomes for dissolved oxygen to invade the interior of cord-like strings 29*b* shown in FIG. 4A and 4B. As a result, the vinylidene chloride fillers 71 are placed in an anaerobic condition, and anaerobic microorganisms grow. Therefore, in the same manner as the first embodiment, the more sludge is attached to this vinylidene chloride fillers 71, the higher the concentration of anaerobic microorganisms becomes. The vinylidene chloride fillers 71 come to an appropriate condition for performing an anaerobic treatment.

Plural pieces of the vinylidene chloride fillers 71 are fixed between two sheets of plates placed oppositely at a given interval. A plurality of membrane filters 72 are placed above the vinylidene chloride fillers 71. The membrane filters 72 are disposed in the horizontal direction.

A pipe is connected to the right end of the filters 72, and a storage pump 73 is connected to the pipe. This filters 72 are placed on the suction side of the storage pump 73. When this storage pump 73 is operated, water to be treated is introduced into the pump 73 through the filters 72.

A membrane filter diffuser pipe 75 is placed between the membrane filter 72 and the vinylidene chloride fillers 71. This diffuser pipe is connected to a blower 90. Also, a circulation diffuser pipe 76 is placed a little below the vertical center of the vinylidene chloride fillers 71 and on one side thereof. Also, a dissolved oxygen meter 82 is placed near the filters 72. The amount of air which the circulation diffuser pipe 76 discharges is basically controlled on the basis of the amount of dissolved oxygen that the dissolved oxygen meter 82 has measured. Generally, the amount of discharged air is set to 60–80 m$^3$/day per 1 m$^3$ of tank capacity.

A sludge separation diffuser pipe 78 is placed at the bottom of the anaerobic portion 70, and the sludge separation diffuser pipe 78 is connected to a sludge separation blower 91. In addition, a dissolved oxygen meter 81 is placed near a side wall of this anaerobic portion 70. An operation time per day of the sludge separation blower 91 is decided by a concentration of dissolved oxygen which the dissolved oxygen meter 81 has measured.

An operation time per day of the blower 91 is very short. Specifically, it is within 10 minutes per day. That is to say, the sludge separation blower 91 is designed to stop when a concentration of dissolved oxygen in the lower anaerobic portion 70 is 0.3 ppm or more. Besides, the amount of air which the sludge separation diffuser pipe 78 discharges is set to about twice the amount of air which the circulation diffuser pipe 76 discharges, and is set to about 120–160 m$^3$/day per 1 m$^3$ of tank capacity. The sludge separation diffuser pipe 78 is used for separating sludge which grows by attaching to the vinylidene chloride fillers 71. And, a waste water introduction pipe 80 is placed above the sludge separation diffuser pipe 78. This waste water introduction pipe 80 is connected to the storage tank pump 58.

The anaerobic portion 70 and the first contact circulation portion 68 in the first lower submerged portion 61 are submerged by waste water introduced from the waste water introduction pipes 80.

This waste water introduction pipe 80 comprises a plurality of small holes 80*a* which are in its upper portion with a given pitch. Waste water is evenly discharged upwards from these small holes.

A nutriment pump 95 and a nutriment tank 96 are connected to pipes which are distributed in an uppermost portion of the lower submerged portion 61. Nutriment including phosphorus such as phosphoric acid and the like is stored in the nutriment tank 96. Nutriment stored in the nutriment tank 96 is supplied to the lower submerged portion 61 by driving the nutriment pump 95. The nutriment such as phosphoric acid contributes to normal growing of aerobic and anaerobic microorganisms in the first bioreactor 52, and maintenance of microorganism sedimentation. As a guide, addition of the quantity of the nutriment is about 20% of total quantity of inflow nitrogen. Furthermore, alcohol as a hydrogen donor is added to the first bioreactor 52. Addition of alcohol is executed by an alcohol storage tank and an alcohol pump (not shown). Methanol is generally used for the above alcohol, however there is specially no functional problem even if waste of IPA used in a semiconductor plant and the like is employed. As a guide, the amount of addition of the alcohol is about twice the total amount of nitrogen.

The second bioreactor 53 comprises a second reaction sprinkle portion 101 as the second upper wetting portion and a second contact circulation portion 102 as the second lower submerged portion. The second bioreactor 53 also comprises an air lift pump 103. This air lift pump 103 extends upwards from a lowest portion of the second contact circulation portion 102 along a side wall of the second contact circulation portion 102, and penetrates the ceiling of the second contact circulation portion 102. In addition, this air lift pump 103 extends along the outside of a side wall of the second reaction sprinkle portion 101, bends at a right angle in a position a little upper than the vertical center of this side wall, penetrates the side wall, extends horizontally to the sprinkle portion 101, and reaches the opposite side wall. A pipe extending from a blower 92 is connected to a bottom portion of the air lift pump 103. Also, a part of the air lift pump 103 within the sprinkle portion 101 constitutes a sprinkle pipe 104.

In the second reaction sprinkle portion 101, a plurality of plastic fillers 105 are placed above the sprinkle pipe 104. Also, a lattice plate 65 is fixed at the bottom of the sprinkle portion 101. The plastic fillers 105 and the charcoal 106 are alternately stacked between the lattice plate 65 and the sprinkle pipe 104. In addition, an exhaust fan 107 is placed below the lattice plate 65 at the bottom of the sprinkle portion 101. The exhaust fan 107 is used for introducing exhaust gas including organic substances to the bottom portion. The exhaust gas introduced into the bottom portion is discharged from an uppermost discharge portion 108 through the lattice plate 65, the plastic fillers 105 and the charcoal 106.

On the other hand, the second contact circulation portion 102 has charcoal 106 and calcium carbonate mineral 110. The charcoal 106 and the calcium carbonate mineral 110 are alternately stacked and wrapped in a net 109. "Binchotan" charcoal is used as the charcoal 106, and oyster shells are used as the calcium carbonate mineral 110. "Kansuiseki" limestones can also be used as the calcium carbonate mineral. Microorganisms more easily attach to "Binchotan" charcoal, oyster shells and "Kansuiseki" limestones and more easily grow in comparison with artificial fillers. Also, since "Binchotan" charcoal has a specific gravity of not less than 1 and does not float in water, "Binchotan" charcoal is suitable for fillers. A circulation diffuser pipe 111 is placed at the bottom of the circulation portion 102. This circulation diffuser pipe is connected to a contact circulation blower 93. An amount of air discharged from this circulation diffuser pipe 111 can be set to 60–80 $m^3$/day per $m^3$ of tank capacity of the second contact circulation portion 102.

A pipe extending from the storage pump 73 connected to the first contact circulation portion 68 is connected to the upper portion of the circulation portion 102. In addition, a bottom surface 102a of the circulation portion 102 tilts so that a lower end of the air lift pump 103 is in the lowest portion of the circulation portion 102. Since the bottom surface 102a tilts, substances separated from the charcoal 106 and the calcium carbonate mineral 110 are automatically introduced into the lower end of the air lift pump 103.

In the denitrification tank 55, a pipe extending from the upper portion of the second contact circulation portion 102 is connected to an upper portion of the tank 55. The denitrification tank 55 also comprises charcoal 106 and calcium carbonate mineral 110. The charcoal 106 and the calcium carbonate mineral 110 are alternately stacked and wrapped in a net 113. The net 113 is made of a resign such as corrosion-resisting polyethylene or a stainless-steel storage basket is used. The denitrification tank 55 is provided with a pump 114 for circulating water to be treated. This denitrification tank 55 is a structurally sealed tank. The reason for sealing is that if the denitrification tank 55 is an open tank, a reducing action does not proceed, for oxygen in the air dissolves into the tank. Alcohol as a hydrogen donor, not shown in the drawings, is also added to the denitrification tank 55. Methanol is generally used as alcohol which is added to this denitrification tank 55. However, waste of IPA generated from a semiconductor plant or a liquid crystal plant is also used. In this embodiment, waste of IPA is used. An amount of IPA addition is about three times the total amount of nitrogen in water to be treated which flows into the denitrification tank 55.

The third bioreactor 56 comprises a third reaction sprinkle portion 115 as the third upper wetting portion and a third contact circulation portion 116 as the third lower submerged portion. Also, the third bioreactor 56 comprises an air lift pump 117. The air lift pump 117 extends upward from the lowest portion of the third contact circulation portion 116 along a side wall of the third contact circulation portion 116, and penetrates a ceiling of the third contact circulation portion 116. Furthermore, the air lift pump 117 extends along the outside of a side wall of the third reaction sprinkle portion 115, bends at a right angle in a little upper portion than the vertical center of the side wall, penetrates the side wall, extends horizontally to the reaction sprinkle portion 115, and reaches the opposite side wall. A pipe extending from a blower 92 is connected to the bottom portion of this air lift pump 117. Also, a part of this air lift pump 117 within the reaction sprinkle portion 115 forms a sprinkle pipe 118.

In the third reaction sprinkle portion 115, a plurality of plastic fillers 105 are placed above the reaction sprinkle pipe 118. Also, a lattice plate 65 is fixed at the bottom of the sprinkle portion 115. The plastic fillers 105 and the charcoal 106 are alternately stacked between the lattice plate 65 and the sprinkle pipe 118. In addition, an exhaust fan 121 is placed below the lattice plate 65 at the bottom of the reaction sprinkle portion 115. The exhaust fan 121 is used for introducing exhaust gas containing organic substances into the bottom portion of the reaction sprinkle portion 115. The exhaust gas introduced into the bottom portion is discharged from an uppermost discharge portion 122 through the lattice plate 65, the plastic fillers 105 and the charcoal 106.

On the other hand, the third contact circulation portion 116 has charcoal 106 and calcium carbonate mineral 110. The charcoal 106 and the calcium carbonate mineral 110 are alternately stacked and wrapped in a net 123. A circulation diffuser pipe 125 is placed at the bottom portion of the third contact circulation portion 116. The circulation diffuser pipe 125 is connected to the contact circulation blower 93. A pipe extending from the denitrification tank 55 is connected to an upper portion of the third circulation portion 116. In addition, a bottom surface 116a of the circulation portion 116 tilts so that a lower end of the air lift pump 117 is in the lowest portion of the circulation portion 116. Since the bottom surface 102a tilts, substances separated from the charcoal 106 and the calcium carbonate mineral 110 are automatically introduced into the lower end of the air lift pump 117. Besides, it is sufficient for an tilt angle of the bottom surface 116a to be 10° or more.

A pipe extending from an upper portion of the third contact circulation portion 116 of the third bioreactor is connected to an upper portion of the precipitation tank 57. Also, the precipitation tank 57 includes a bottom portion 57a tapering toward the lowest point of the tank 57 and a cylindrical portion 57b extending upward from the bottom portion 57a. The precipitation tank 57 has a collector 126. The collector 126 comprises a cone-shaped collecting portion 126a placed at the bottom portion 57a. A return sludge pump 127 is connected to the lowest point of the bottom portion 57a. A return pipe 128 extending from the return sludge pump 127 is connected to a ceiling portion of the first reaction sprinkle portion 60, a ceiling portion of the second reaction sprinkle portion 101 and a ceiling portion of the third reaction sprinkle portion 115. The return sludge pump 127 has a function of sucking sludge accumulated on the bottom portion 57a and returning sludge to the first, the second and the third reaction sprinkle portions, 60, 101 and 115 respectively, via the return pipe. Also, supernatant of water being treated, which has been separated into solid and liquid, can be taken out from the upper portion of this precipitation tank 57.

In this embodiment, oyster shells are selected as the calcium carbonate mineral 110 in the second bioreactor 53, in the denitrification tank 55 and in the third bioreactor 56. Otherwise, coral, "Kansuiseki" limestones or marbles are used, though oyster shells are the most inexpensive. It is desirable to select oyster shells which are left on the land for about one year and do not have any offensive odor at all. Microorganisms easily grow and form biological membrane on oyster shell surfaces.

In the waste water treatment apparatus constituted as described above, high-concentration waste water including developer drained from a semiconductor plant or a liquid crystal plant, is firstly stored in the storage tank 51. On the other hand, exhaust gas containing organic substances, derived from production facilities, is introduced into the first bioreactor 52, the second bioreactor 53 and the third reactor 56 by exhaust fans 66, 107, 121.

Waste water to be treated is introduced into the lower submerged portion 61 of the first bioreactor 52 from the storage tank 51 by operating the storage tank pump 58. Then, an anaerobic portion 70 and the first contact circulation portion 68 are submerged in this water to be treated, as shown in FIG. 8. Also, air from the blower 90 is discharged from the circulation diffuser pipe 76. The amount of discharged air is 60–80 $m^3$/day per $m^3$ of tank capacity. The first contact circulation portion 68 is made aerobic. More specifically, operation of the blower 90 is controlled according to a dissolved oxygen concentration which a dissolved oxygen meter has measured.

With passage of the operational time, sludge containing microorganisms attaches to the vinylidene chloride fillers 71 of the first contact circulation portion 68, and grows. Microorganism sludge which has attached to the vinylidene chloride fillers 71 and has grown, is separated about twice a day by air discharged from the sludge separation diffuser pipe 78. Also, air discharged from this sludge separation diffuser pipe 78 makes an anaerobic portion 70 aerobic about twice a day in order to inhibit generation of gas due to anaerobic preservation for a long time. This inhibition of gas generation prevents anaerobic microorganism sludge from going up to the first contact circulation portion 68. Operation time of the sludge separation blower 91 per day depends upon concentration of dissolved oxygen which has been measured by the dissolved oxygen meter 81. Specifically, the operation time is very short, and 10 minutes or less are sufficient as a guide for it. Also, the sludge separation blower 91 will stop when a concentration of dissolved oxygen of the anaerobic portion 70 which has been measured by the dissolved oxygen meter 81 becomes 0.3 ppm or more.

On the other hand, the microorganism sludge separated from the vinylidene chloride fillers 71 has high-concentration aerobic microorganisms on the surface thereof and anaerobic microorganisms in the inside thereof. After the anaerobic microorganisms of the inside are separated by the above-mentioned separation, fine anaerobic microorganisms appears. The anaerobic microorganisms are effectively used for denitrification treatment of water to be treated. As a matter of fact, when flocks of microorganisms are separated and destructed by aeration, a concentration of microorganisms in the first contact circulation portion 68 of the first bioreactor 52 increases abruptly. Since the high-concentration microorganisms include not only aerobic microorganisms but also anaerobic microorganisms, not only treatment of organic substances which water to be treated contains but also treatment of nitrate nitrogen, i.e. denitrification, can be performed by various kinds of microorganisms.

It is desirable that a concentration of microorganisms of the first contact circulation portion 68 in the first bioreactor 52 is controlled to be about 25,000 ppm or more in terms of MLSS. Also, preferably a concentration of microorganisms of the anaerobic portion 70 in the first bioreactor 52 is 35,000 ppm or more in MLSS. High-concentration organic waste water containing developer is effectively treated.

Waste water which has been treated in the lower submerged portion 61 of the first bioreactor 52, as supernatant which has passed through the membrane filter 72, is pumped up by the storage pump 73, and is introduced into the second bioreactor 53.

On the other hand, exhaust gas introduced by the exhaust fan 66 is introduced into the first reaction sprinkle portion 60 as the upper wetting portion of the first bioreactor 52. From the view-point of exhaust gas treatment, there is odoral gas which the first bioreactor 52 itself generates, in addition to exhaust gas introduced by the exhaust fan 66. In this embodiment, the first contact circulation portion 68 of the first bioreactor 52 is operated when a concentration of microorganisms is about 25,000 ppm or more (i.e. under an extremely high-concentration condition) in terms of MLSS. Therefore, the odoral gas is generated to some degree in the first contact circulation portion 68. However, an amount of the odoral gas is less than that of the odoral gas generated from a conventional anaerobic tank. This is because the first contact circulation portion 68 is not in an anaerobic condition but is always in an aerobic condition. In other words, though anaerobic microorganisms are partially employed in waste water treatment, the first contact circulation portion 68 is always in an aerated condition. Accordingly, the first bioreactor 52 is an apparatus which generates a considerably smaller amount of offensive odor than a conventional anaerobic tank.

Exhaust gas containing organic substances from production facilities and odoral gas which the first bioreactor 52 itself generates, are introduced into the first reaction sprinkle portion 60. Exhaust gas containing organic substances such as organic solvent of IPA and the like from production facilities are introduced into the first reaction sprinkle portion 60 by the exhaust fan 66.

At the top of the first reaction sprinkle portion 60, return sludge containing biological membrane from a return sludge pump 127 is sprinkled. The return sludge is of biological membrane separated from the third contact circulation portion 116. The return sludge attaches to plastic fillers 62 and charcoal 63 which are alternately stacked. As a result, biological membrane is securely formed on the plastic fillers 62 and the charcoal 63. This biological membrane treats the exhaust gas biologically.

In addition, since the charcoal 63 with which the first reaction sprinkle portion 60 is packed has an adsorption ability, the charcoal 63 adsorbs organic substances in exhaust gas. The organic substances the charcoal 63 has adsorbed are biologically treated by microorganisms which have grown in the inside of the charcoal 63. It is desirable to select ebony having an adsorption ability as charcoal 63. After adsorbed, the organic substances are biologically treated in the first reaction sprinkle portion 60 by grown microorganisms. Therefore, any replacement of charcoal 63 is not necessary in this embodiment. This embodiment enables much more reduction of running cost to be realized in comparison with any conventional exhaust gas treatment systems using activated carbon.

Waste water which has been treated in the first bioreactor 52 is introduced into the second contact circulation portion 102 of the second bioreactor 53 via the storage pump 73. Water to be treated which has been introduced into the second contact circulation portion 102 is agitated by air discharged from the circulation diffuser pipe 111, and is circulated in the second contact circulation 102. An amount of air discharged from the circulation diffuser pipe 111 is 60–80 m$^3$/day per m$^3$ of capacity of the circulation portion 102. The water to be treated is treated by microorganisms which have grown in calcium carbonate mineral 110 and charcoal 106 stacked alternately.

Air discharged from the circulation diffuser pipe 111 separates biological membrane which is comprised of microorganisms which have grown in and on the calcium carbonate mineral 110 and the charcoal 106. In addition, when the amount of air discharged from the circulation diffuser pipe 111 is increased more than that at the time of normal operation, separation of the biological membrane is furthermore promoted. The separated biological membrane precipitates and accumulates on the bottom surface 102a, and becomes biological membrane sludge. The biological membrane sludge moves toward the lower end of the air lift pump 103 along the bottom surface 102a, and is sucked together with water to be treated by the air lift pump 103, and is sprinkled from the sprinkle pipe 104 together with the water to be treated, and is introduced into the second reaction sprinkle portion 101. So, the biological membrane sludge attaches to the plastic fillers 105 and the charcoal 106, and the microorganisms grow. Exhaust gas containing organic substances introduced from the exhaust fan 107 is treated by the microorganisms. This biological membrane sludge is supplied with sufficient oxygen when water to be treated is sprinkled, drops partially, and returns to the second contact circulation portion 102, and is used for microorganism treatment of water to be treated.

On the other hand, waste water containing developer includes resist as a coloring component, and chromaticity is about 4500 degree. First, the resist in waste water is adsorbed onto the charcoal 106 packed in the second contact circulation portion 102. Next, the resist adsorbed on the charcoal 106 is biologically treated by various kinds of microorganisms grown in and on the charcoal 106. Therefore, the charcoal having various kinds of microorganisms can be called biologically activated charcoal.

The calcium carbonate mineral 110 performs a function of neutralization against an acid phenomenon of water being treated, when nitrogen compounds which the water being treated contains are biologically oxidized and generate nitrite nitrogen and/or nitrate nitrogen. Surfactant, coloring components and nitrogen compounds, which the water contains, can be effectively reduced if time of contact reaction in the second contact circulation portion is sufficiently long.

Next, water being treated is introduced into the denitrification tank 55 from the second contact circulation portion 102 of the second bioreactor 53 in a gravity flow method. In this denitrification tank 55, nitrate nitrogen which water to be treated has contained is reduced into nitrogen gas, and the water is thus denitrified. In the denitrification tank 55, charcoal 106 ("Binchotan" charcoal) and calcium carbonate mineral 110 are packed in the same manner as the second contact circulation portion 102. "Binchotan" charcoal 106 exerts a physical action to adsorb coloring components and a role as a fixing carrier of anaerobic microorganisms, that is, a biological action.

A circulation pump 114 placed in the denitrification tank 55 circulates the water to be treated in the tank and sufficiently contacts the water with the charcoal 106 and the calcium carbonate mineral 110. Besides a conventional agitator or a subaqueous agitator can be placed instead of the circulation pump 114. It is important for water to be treated in the tank to sufficiently contact with the charcoal 106 and the calcium carbonate mineral 110. Since the denitrification tank 55 has a shielded structure, oxygen in the air cannot dissolve into the tank. Therefore, a reducing action can proceed under the anoxia condition. Also, since alcohol as a hydrogen donor is added to the denitrification tank 55, the COD value of water to be treated which has been denitrified increases. Next, the water with the COD value increased is introduced into the third bioreactor 56 so as to decrease the COD value and reduce the coloring components.

In the third bioreactor 56, in the same manner as that in the second bioreactor 53, the air lift pump 117 introduces water to be treated from the third contact portion 116 into the third reaction sprinkle portion 115, and sprinkles the water from the sprinkle pipe 118. Biological membrane is formed on charcoal 106 and plastic fillers 105 with the passage of time, and the biological membrane treats waste water and exhaust gas. In the third contact circulation portion 116, waste water is treated by microorganisms which have grown in charcoal 106 and calcium carbonate mineral 110. Thus, COD of water to be treated is reduced. Coloring components of water to be treated are treated by microorganisms.

As to exhaust gas, in the third reaction sprinkle portion 115, exhaust gas is treated by performing both biological treatment of biological membrane and physical treatment of adsorption in the same manner as that in the second bioreactor 53.

In the diffuser pipe 125 placed at the bottom of the third contact circulation portion 116, the amount of discharged air is controlled strongly and weakly. The strong and weak control can be performed by invertor-controlling the contact circulation blower 93. Air which the diffuser pipe 125 discharges separates biological membrane attached to the charcoal 106 and the calcium carbonate mineral 110. Separated biological membrane is easily introduced into the third reaction sprinkle portion 115 by the air lift pump 117. In addition, since the bottom surface 116a tilts, the separated biological membrane easily moves toward the air lift pump 117. The tilt of the bottom surface 116a is the same as the tilt of the bottom surface 102a of the second bioreactor 53. In the third bioreactor 56, as in the second reactor 53, waste water is three-dimensionally treated by the third contact circulation portion 116 and the third reaction sprinkle portion 115.

Next, water to be treated is introduced from the third bioreactor 56 into the precipitation tank 57. In the precipitation tank 57, solid substances of the water precipitate, so that the water is separated into solid and liquid. Up to the precipitation tank 57, water to be treated has experienced four steps of treatments through the first and the second bioreactors 52, 53, the denitrification tank 55 and the third bioreactor 56. Therefore, solid substances precipitated in the precipitation tank 57 are much smaller than those in the first and the second embodiments. The solid substances i.e. biological sludge in the precipitation tank 57 is collected with the collecting portion 126a of the collector 126, and is introduced into the first reaction sprinkle portion 60, the second reaction sprinkle portion 101, and the third reaction sprinkle portion 115. Thus, the biological sludge, returned to each reaction sprinkle portion 60, 101, 115, is useful for exhaust gas treatment, and is supplied with oxygen in each reaction sprinkle portion 60, 101, 115, and returns to each contact circulation portion 68, 102, 116. The amount of introduction of return sludge can be decided by the amount and concentration of exhaust gas which contains organic substances and introduced into each reaction sprinkle portion 60, 101, 115.

Oyster shells are selected as calcium carbonate fillers 110 in each tank 53, 55, 56. Coral, "Kansuiseki" limestones and marbles can be used, though oyster shells are most inexpensive. It is desirable to select oyster shells which are left on the land for about one year and do not have any offensive odor at all. The waste water is filtrated by biological membrane attached to the surfaces of oyster shells when the waste water is repeatedly circulated in the contact circulation portions 102, 116 with the circulation diffuser pipes 111, 125. Therefore, the rapid filtration tower 148 shown in FIG. 12 is not required when this embodiment is employed.

Figure 12:
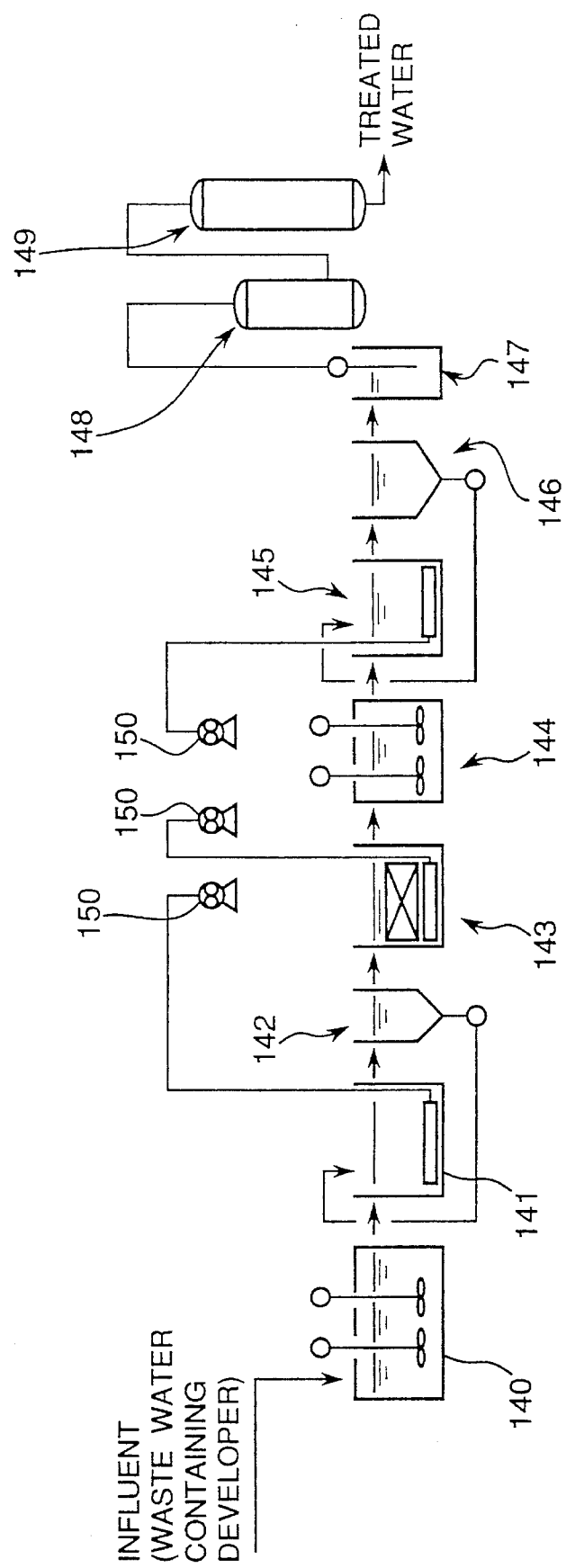
FIG. 12 is a schematic drawing of another conventional waste water treatment apparatus.
Figure 13:
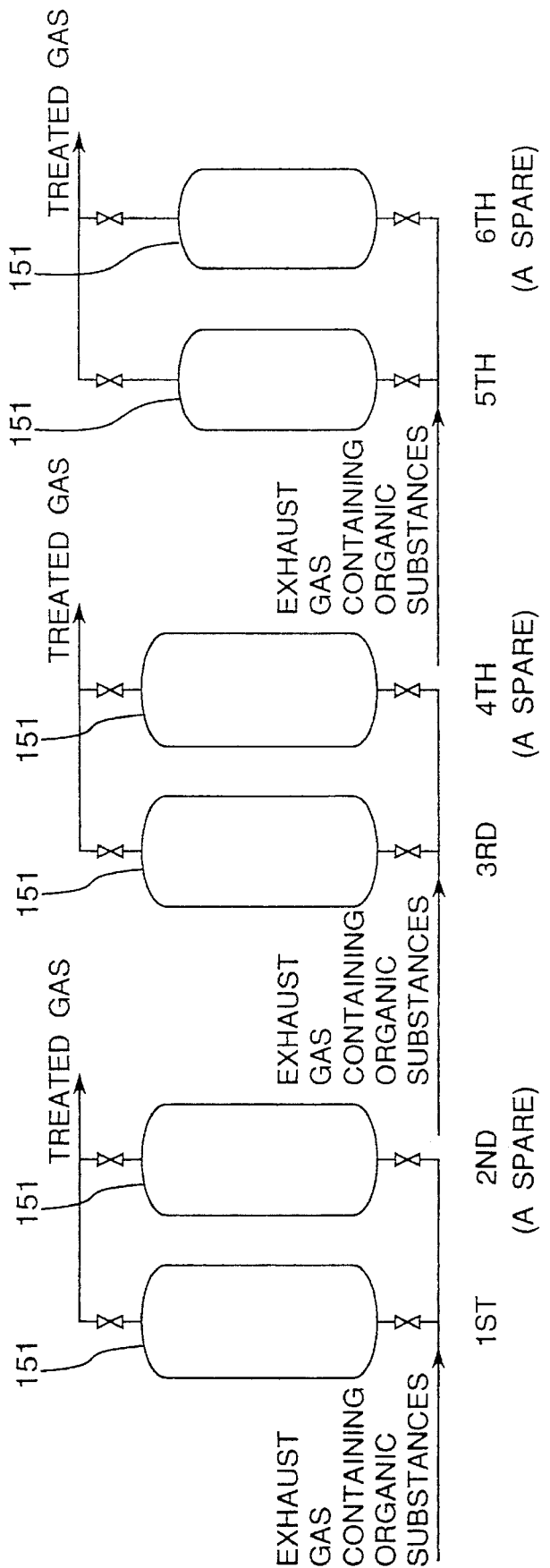
FIG. 13 is a schematic drawing of another conventional exhaust gas treatment apparatus.
Figure 14:
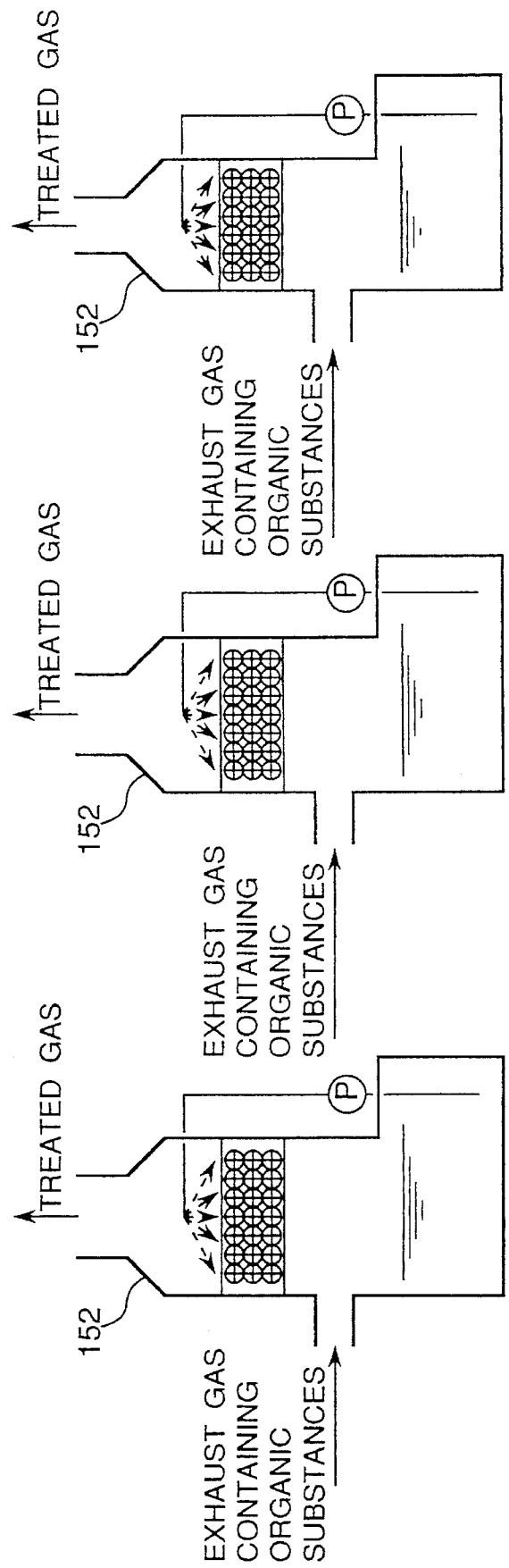
FIG. 14 is a schematic drawing of still another conventional exhaust gas treatment apparatus.

Next, comparative experimental examples according to the third embodiment shown in FIG. 8 and a prior art shown in FIG. 12 are described with respect to the water quality of treated water and concentration of treated gas.

First, in the third embodiment, the experimental apparatus is comprised of the first bioreactor 52 with a capacity of 1.3 m$^3$, the second contact circulation portion 102 with a capacity of 0.6 m$^3$, the denitrification tank 55 with a capacity of 0.4 m$^3$, the third contact circulation portion 116 with a capacity of 0.3 m$^3$, the precipitation tank 57 with a capacity of 0.1 m$^3$, the first reaction sprinkle portion 60 with a capacity of 0.6 m$^3$, the second reaction sprinkle portion 101 with a capacity of 0.3 m$^3$, and the third sprinkle portion 115 with a capacity of 0.15 m$^3$. "Binchotan" charcoal carbonized at about 1000° C. is packed in the second contact circulation portion 102, the denitrification tank 55 and the third contact circulation portion 116. Also, oyster shells produced in Toba of Mie-ken in Japan, which have left ashore for one year and do not have almost any odor, are employed.

Waste water treatment data for the prior art example shown in FIG. 12, were obtained from literature of IC industries. Waste water treatment data of experimental units for the third embodiment, and waste water treatment data of the conventional example have been compared. In the experiments, the third embodiment apparatus was run on trial for about three months, and then data of the treatment were collected.

Waste water containing developer was introduced into the first bioreactor, and water quality of treated water stabilized after trial operations were performed for about three months. Residential excessive sludge was charged from the beginning of the trial operations, so that microorganism sludge attached to the vinylidene chloride 71 within the first bioreactor 52. At first, "Binchotan" charcoal and oyster shells of the second contact circulation portion 102 did not change at all, however with the passage of one month or more, something like a biological membrane was slightly formed on their surfaces. This biological membrane was a unique thin biological membrane appearing on the charcoal and the oyster shells, and was not so thick as biological membrane which generally appears on contact materials used in waste water treatments such as a rotating plate process and a submerged bed process.

After completion of the trial operations, data measured for three days were compiled in connection with water quality before entering the first bioreactor 52 i.e. water quality of the storage tank 51, and water quality at the exit of the precipitation tank 57. The results are shown as follows. Also, as to exhaust gas containing organic substances, the result measured before and after the treatment is shown as follows. When measuring concentrations of exhaust gas containing organic substances at the inlet and the outlet in this embodiment, all the blowers (90,91,92,93) for waste water treatment were stopped for a short time. This is because introduction of air by the blowers can have an effect on the measurement results of exhaust gas concentrations.

Water quality at the inlet of the first bioreactor 52 of the third embodiment shown in FIG. 8

| | |
|---|---|
| pH | 12.3 or lower |
| BOD | 2500 ppm or below |
| COD | 2600 ppm or below |
| TOC | 4000 ppm or below |
| TMAH | 7800 ppm or below |
| SS | 35 ppm or below |
| Total nitrogen | 800 ppm or below |
| Cationic surfactant | 33 ppm or below |
| Anionic surfactant | 6 ppm or below |
| Chromaticity | 4500 degree or less |

Water quality at the outlet of the precipitation tank shown in FIG. 8

| | |
|---|---|
| pH | 6.4 to 8.6 |
| BOD | 5 ppm or below |
| COD | 5 ppm or below |
| TOC | 5 ppm or below |
| TMAH | 1 ppm or below |
| SS | 10 ppm or below |
| Total nitrogen | 20 ppm or below |
| Cationic surfactant | 0.4 ppm or below |
| Anionic surfactant | 0.2 ppm or below |
| Chromaticity | 5 degree or less |

As seen from the above results, as to the treated water at the outlet of the waste water treatment apparatus in the third embodiment of the present invention, removal percentages of each component in waste water at the inlet are 99% or more in TMAH, 99% or more in BOD, 95% or more in total nitrogen, 95% or more in surfactant, and 99% or more in chromaticity. That is to say, the apparatus according to the third embodiment obtained treated water of a quality similar to that, shown below, obtained by a treatment process in the prior art shown in FIG. 12.

Water quality at the outlet of the activated carbon adsorption tower 149 in the prior art embodiment shown in FIG. 12

| | |
|---|---|
| pH | 7.2 to 8.6 |
| BOD | 5 ppm or below |
| COD | 5 ppm or below |
| TOC | 5 ppm or below |
| TMAH | 1 ppm or below |
| SS | 5 ppm or below |
| Total nitrogen | 20 ppm or below |
| Cationic surfactant | 0.4 ppm or below |
| Anionic surfactant | 0.2 ppm or below |
| Chromaticity | 5 degree or less |

Also, the results of exhaust gas are as follows.

Concentrations of exhaust gas at the inlets of the first, the second, and the third reaction sprinkle portions shown in FIG. 8.

Isopropyl alcohol (exhaust gas): 3 ppm or less

Concentrations of exhaust gas at the outlets of the first, the second and the third sprinkle portions shown in FIG. 8

Isopropyl alcohol (exhaust gas): 1 ppm or less

As seen from the above-mentioned results, concentrations at the outlets of the first, the second and the third reaction sprinkle portions were reduced by 60% or more in comparison with concentrations of the inlets.

As seen from the experimental examples, according to the third embodiment, waste water containing developer which includes nitrogen, coloring components and surfactant can securely be treated. Also, exhaust gas containing organic substances of IPA and the like can securely be treated. In other words, the third embodiment water treatment method can more effectively and economically treat waste water containing nitrogen, coloring components, surfactant, and exhaust gas in simpler facilities than prior art processes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for waste water treatment comprising:
    a first bioreactor including a lower portion having an inflow pipe for admission of a water to be treated and an aeration means, and an upper portion packed with vinylidene chloride fillers and having an air supply agitation means for supplying air to the upper portion;
    an aeration control means for controlling operation and stopping of the aeration means in the lower portion of the first bioreactor to periodically separate microorganisms deposited on the vinylidene chloride fillers therefrom; and
    a second bioreactor including a contact circulation portion into which the water under treatment is to be introduced from the first bioreactor, the contact circulation portion being packed with charcoal and calcium carbonate fillers, and an aeration diffuser for aerating the contact circulation portion.

2. An apparatus for waste water treatment as set forth in claim 1, further comprising:
    a membrane filter disposed above the vinylidene chloride fillers in the upper portion of the first bioreactor.

3. An apparatus for waste water treatment as set forth in claim 1, further comprising:
    an exhaust gas introduction diffuser for directing an exhaust gas present in an uppermost portion of the first bioreactor to the contact circulation portion of the second bioreactor.

4. An apparatus for waste water treatment as set forth in claim 1, wherein the first bioreactor has a separation wall provided between the upper and lower portions thereof for inhibiting convection between the upper and lower portions.

5. An apparatus for waste water treatment as set forth in claim 1, further comprising:
    a control means for controlling the operation of the air supply agitation means to high and low levels.

6. An apparatus for waste water treatment as set forth in claim 4, further comprising:
    a control means for controlling the operation of the air supply agitation means to high and low levels.

7. A method for waste water treatment comprising the steps of:
    introducing waste water to be treated into a lower portion of a first bioreactor via an inflow pipe, anaerobically treating the water in that lower portion, then directing the water under treatment to an upper portion of the first bioreactor;
    operating and stopping an aeration means provided in the lower portion of the first bioreactor to temporarily produce microbial conditions in which anaerobic and aerobic microorganisms are present in mixture, and treating the water under the mixed microbial conditions; and
    introducing the water under treatment from the first bioreactor into a second bioreactor to permit the water to be introduced into a contact circulation portion of the second bioreactor, thereby allowing the water to come into contact with charcoal and calcium carbonate fillers which are present in the contact circulation portion.

8. A method for waste water treatment as set forth in claim 7, wherein the water to be treated is caused to flow in circulation by air being constantly supplied in the upper portion of the first bioreactor so as to pass through a membrane filter, the water being thereby introduced into the second bioreactor through a conduit connected to the membrane filter.

9. A method for waste water treatment as set forth in claim 7, wherein an exhaust gas is introduced into an uppermost portion of the first bioreactor to be mixed with a gas generated during the treatment of the water in the first bioreactor, the resulting mixture of the gases being introduced into the second bioreactor, whereby the exhaust gas is treated simultaneously with the water.

10. An apparatus for waste water treatment comprising:
    a first bioreactor having a first upper wetting portion in which charcoal and plastic fillers are packed and through which exhaust gas passes upward from below, and a first lower submerged portion in which vinylidene chloride fillers are packed, an air supply agitation means is placed near the vinylidene chloride fillers, and an introduction pipe for introducing waste water to be treated and a sludge separation diffuser are provided below the vinylidene chloride fillers;
    a second bioreactor having a second upper wetting portion in which charcoal and plastic fillers are packed, and through which exhaust gas passes upward from below, a second lower submerged portion in which charcoal and calcium carbonate mineral are packed, and an introduction means for introducing the waste water from the first lower submerged portion of the first bioreactor into the second lower submerged portion;
    a denitrification tank having an introduction means for introducing the waste water from the second lower submerged portion of the second bioreactor into the tank and a circulating means for circulating the introduced waste water;
    a third bioreactor having a third upper wetting portion in which charcoal and plastic fillers are packed and through which exhaust gas is passed from below to above, a third lower submerged portion in which charcoal and calcium carbonate mineral are packed, and an introduction means for introducing the water from the denitrification tank into the third lower submerged portion;
    a precipitation tank in which the waste water received from the third submerged portion of the third bioreactor is separated into solid and liquid, supernatant liquid being discharged from the precipitation tank, the precipitation tank having a sludge return means for returning sludge precipitated by the solid-liquid separation to the first upper wetting portion of the first bioreactor, the second upper wetting portion of the second bioreactor, and the third upper wetting portion of the third bioreactor.

11. An apparatus for waste water treatment as set forth in claim 10, further comprising a membrane filter located over the vinylidene chloride fillers in the first submerged portion of the first bioreactor and a diffusion pipe for the membrane filter located between the membrane filter and the vinylidene chloride fillers.

12. An apparatus for waste water treatment as set forth in claim 10, wherein charcoal and calcium carbonate mineral are packed in the denitrification tank.

13. An apparatus for waste water treatment as set forth in claim 10, wherein the second lower submerged portion of the second bioreactor has an air supply agitation means, the apparatus further comprising air supply control means for controlling operational power of the air supply agitation means of the first and second bioreactors.

14. A method for treating nitrogen-containing waste by-products, the method comprising:

(1) introducing waste water to be treated into a first portion of a first bioreactor;

(2) creating an anaerobic condition in the first portion of the first bioreactor and using anaerobic microorganisms in the first portion of the first bioreactor to digest organic substances contained in the waste water; then (3) creating an aerobic condition in a second portion of the first bioreactor and using aerobic microorganisms in the second portion of the first bioreactor to oxidize the waste water; then (4) temporarily creating a condition in the second portion of the first bioreactor wherein both anaerobic and aerobic microorganisms are present in the second portion of the first bioreactor, and wherein the waste water is denitrified by the anaerobic microorganisms.

15. The method of claim 14, wherein step (4) is performed by physically separating sludge from a filter medium in the second portion of the first bioreactor.

16. The method of claim 15, wherein step (4) is performed by operating an aeration diffuser in the first portion of the first bioreactor to physically separate sludge from the filter medium.

17. The method of claim 14, wherein aerobic and anaerobic conditions are varied in concentration and with time within the first bioreactor.

18. The method of claim 14, further comprising:

mixing a waste gas with an organic odoral gas generated in the first bioreactor.

19. The method of claim 18, wherein the waste gas comprises a mineral acid, and wherein the method further comprises:

introducing a mixture of the organic odoral gas and the waste gas into a second bioreactor and treating both the mixture and waste water obtained from the first bioreactor in the second bioreactor.

* * * * *